(12) United States Patent
Sugano et al.

(10) Patent No.: US 11,508,123 B2
(45) Date of Patent: Nov. 22, 2022

(54) IMAGE PROCESSING DEVICE, ENCODING DEVICE, DECODING DEVICE, IMAGE PROCESSING METHOD, PROGRAM, ENCODING METHOD, AND DECODING METHOD FOR PROCESSING MULTIPLE VIDEO CAMERA IMAGE STREAMS TO GENERATE STROBOSCOPIC IMAGES

(71) Applicant: SONY CORPORATION, Tokyo (JP)

(72) Inventors: Hisako Sugano, Kanagawa (JP);
Junichi Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/970,506

(22) PCT Filed: Jul. 23, 2018

(86) PCT No.: PCT/JP2018/027530
§ 371 (c)(1),
(2) Date: Aug. 17, 2020

(87) PCT Pub. No.: WO2019/167300
PCT Pub. Date: Sep. 6, 2019

(65) Prior Publication Data
US 2020/0410754 A1    Dec. 31, 2020

(30) Foreign Application Priority Data
Mar. 1, 2018    (JP) .............................. JP2018-036225

(51) Int. Cl.
*G06T 17/20*    (2006.01)
*G06T 7/55*    (2017.01)
(Continued)

(52) U.S. Cl.
CPC ................ *G06T 17/20* (2013.01); *G06T 7/55* (2017.01); *G06T 15/04* (2013.01); *H04N 5/2625* (2013.01)

(58) Field of Classification Search
None
See application file for complete search history.

(56) References Cited

U.S. PATENT DOCUMENTS 6,665,342 B1 * 12/2003 Brown ............. G08B 13/19691
348/E5.065
2003/0085992 A1 * 5/2003 Arpa ................ G08B 13/19608
348/47

(Continued)

FOREIGN PATENT DOCUMENTS

EP    2031562 A2    3/2009
EP    2166508 A1    3/2010
(Continued)

OTHER PUBLICATIONS

Translation of Apr. 23, 2021, Korean Office Action issued for related KR application No. 10-2020-7023991.

*Primary Examiner* — Edward Martello
(74) *Attorney, Agent, or Firm* — Paratus Law Group, PLLC

(57) ABSTRACT

Image processing apparatus responsive to successive groups of images of an object captured at the same time by two or more spaced apart image capturing devices and to depth information indicating a three-dimensional location of the object relative to at least one distance measuring device includes: a frame selecting unit configured to select a set of the successive image groups; a model generating unit configured to generate a three dimensional model, for each image group in the set of image groups, from images captured at the same time by the two or more spaced apart image capturing devices and from the depth information, (Continued)

and to map a texture to the generated three dimensional model; and a composition unit configured to generate a stroboscopic image, with respect to a stroboscopic image viewpoint, by superposing the three dimensional models generated by the model generating unit on a predetermined background.

21 Claims, 24 Drawing Sheets

(51) Int. Cl.
*G06T 15/04* (2011.01)
*H04N 5/262* (2006.01)

(56) References Cited

U.S. PATENT DOCUMENTS

| | | | |
|---|---|---|---|
| 2004/0017504 A1* | 1/2004 | Prandoni | H04N 5/2625 348/370 |
| 2004/0096085 A1* | 5/2004 | Matsumoto | A63B 69/36 382/107 |
| 2012/0002112 A1* | 1/2012 | Huang | H04N 5/2625 348/579 |
| 2012/0242779 A1* | 9/2012 | Liu | H04N 5/783 348/36 |
| 2012/0242853 A1* | 9/2012 | Jasinski | H04N 5/23245 348/222.1 |
| 2013/0163961 A1 | 6/2013 | Wu et al. | |

FOREIGN PATENT DOCUMENTS

| | | |
|---|---|---|
| JP | 2004-056359 A | 2/2004 |
| JP | 2005-517253 A | 6/2005 |
| JP | 2008-187678 A | 8/2008 |
| JP | 2008-217593 A | 9/2008 |
| JP | 2009-075880 A | 4/2009 |
| JP | 2010-157825 A | 7/2010 |
| JP | 2010-200360 A | 9/2010 |
| JP | 2011-176557 A | 9/2011 |
| JP | 2011-234113 A | 11/2011 |
| JP | 2015-045920 A | 3/2015 |
| JP | 2016-535552 A | 11/2016 |
| KR | 10-1538947 B1 | 7/2015 |
| KR | 10-1562855 B1 | 10/2015 |
| TW | I466062 B | 12/2014 |
| TW | I508027 B | 11/2015 |

* cited by examiner

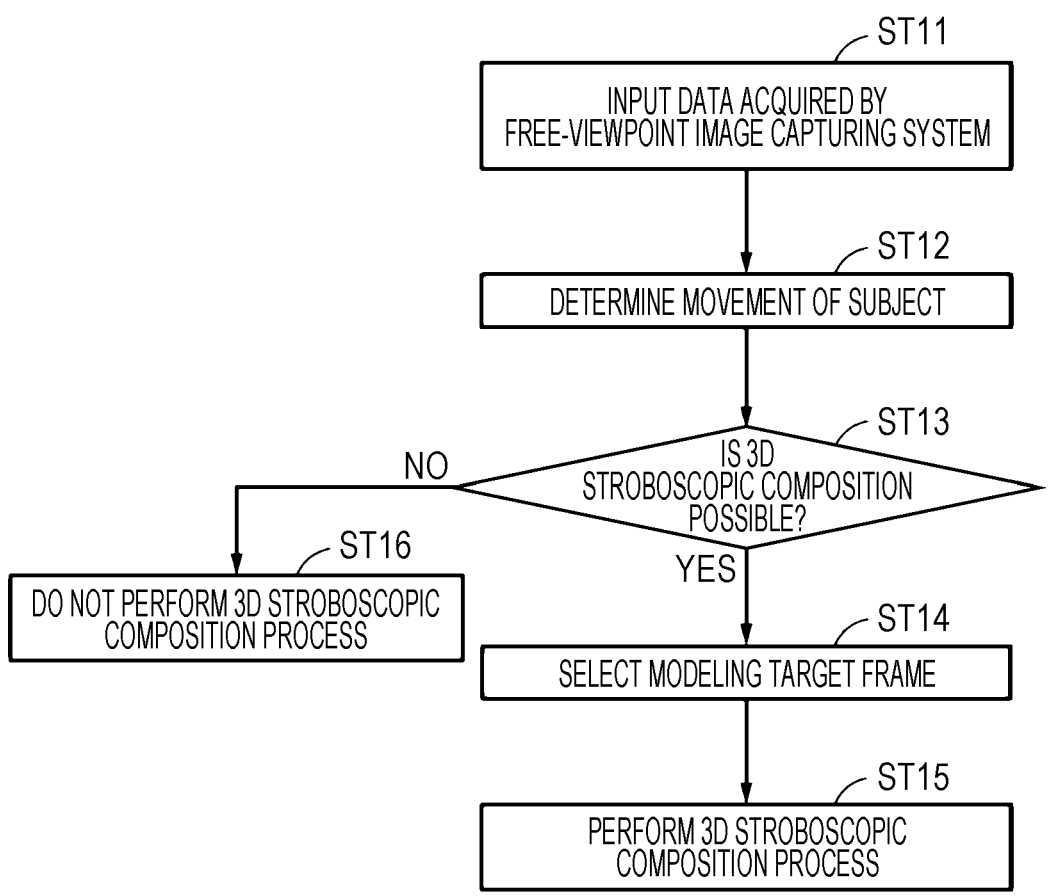

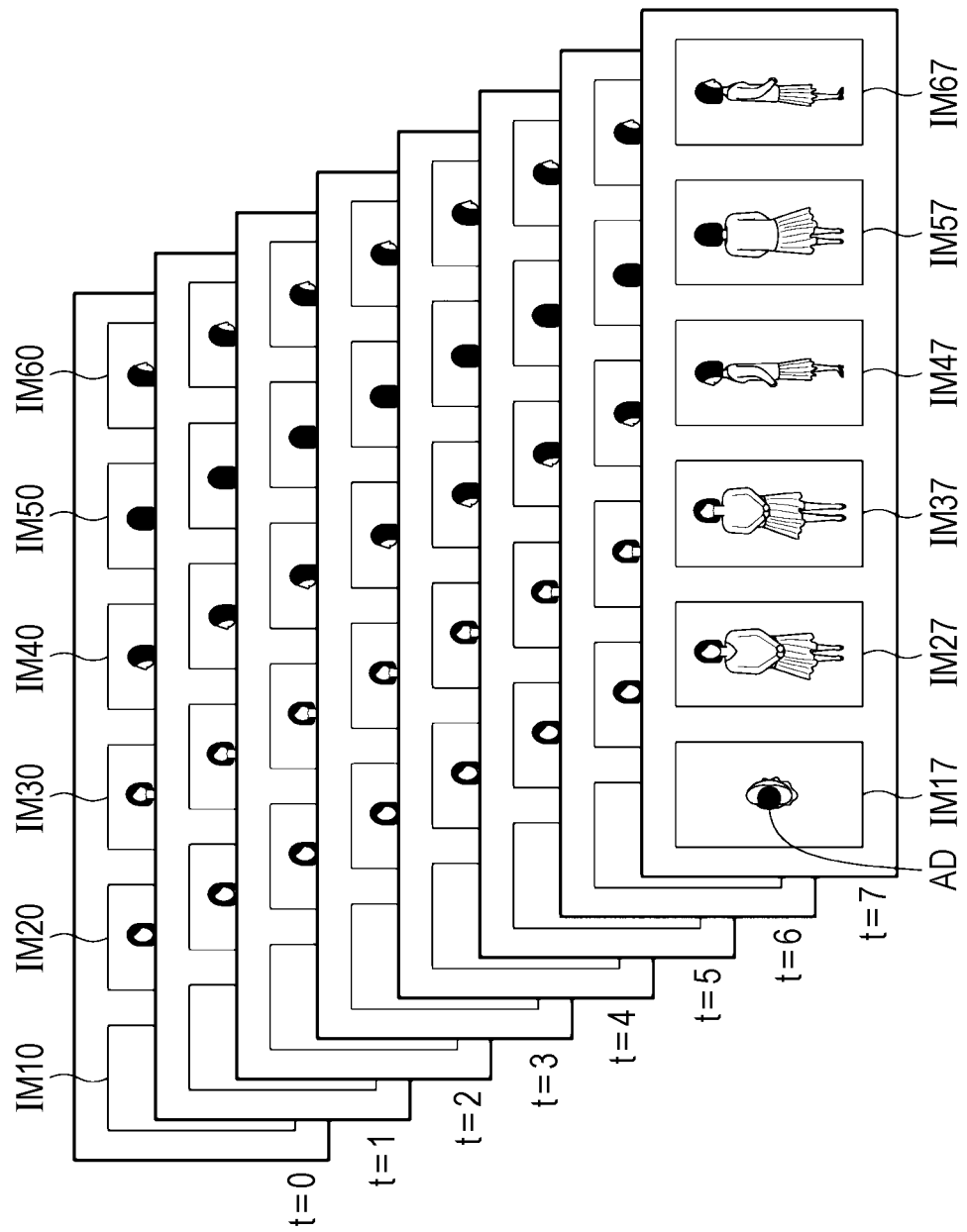

FIG. 12
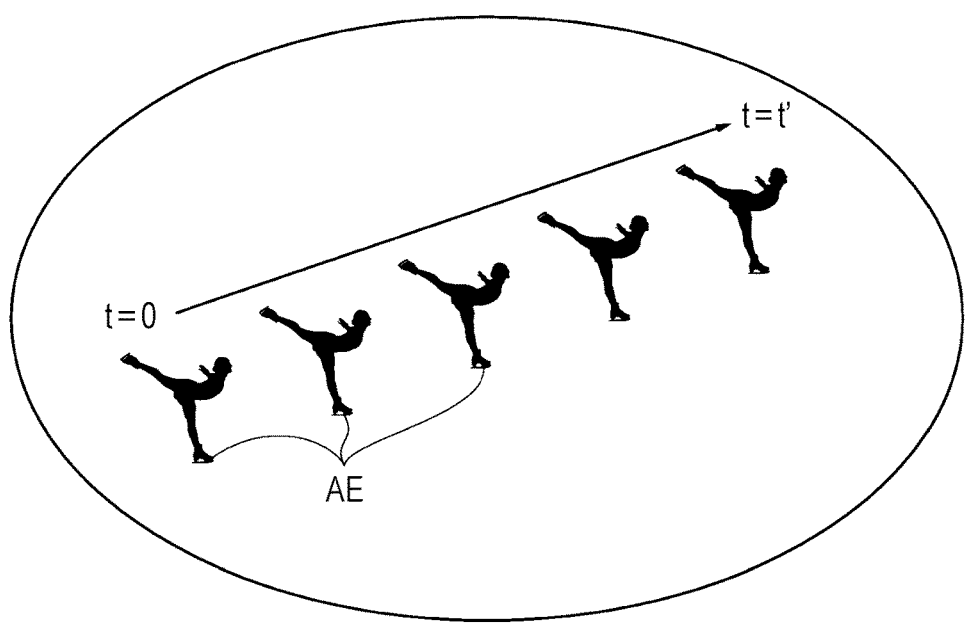
FIG. 13
CASE WHERE OBJECT IS
CLOSE TO VIEWER
CASE WHERE OBJECT IS
DISTANT FROM VIEWER
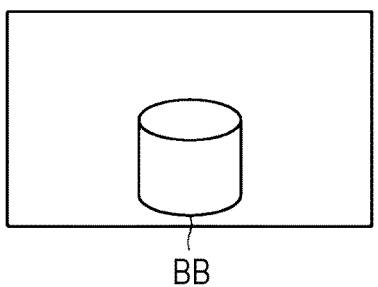
BB
BB
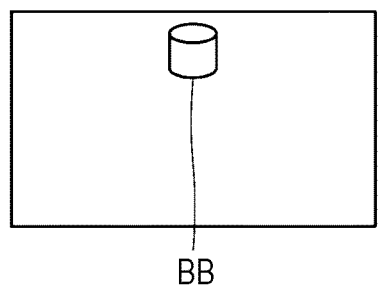
BB

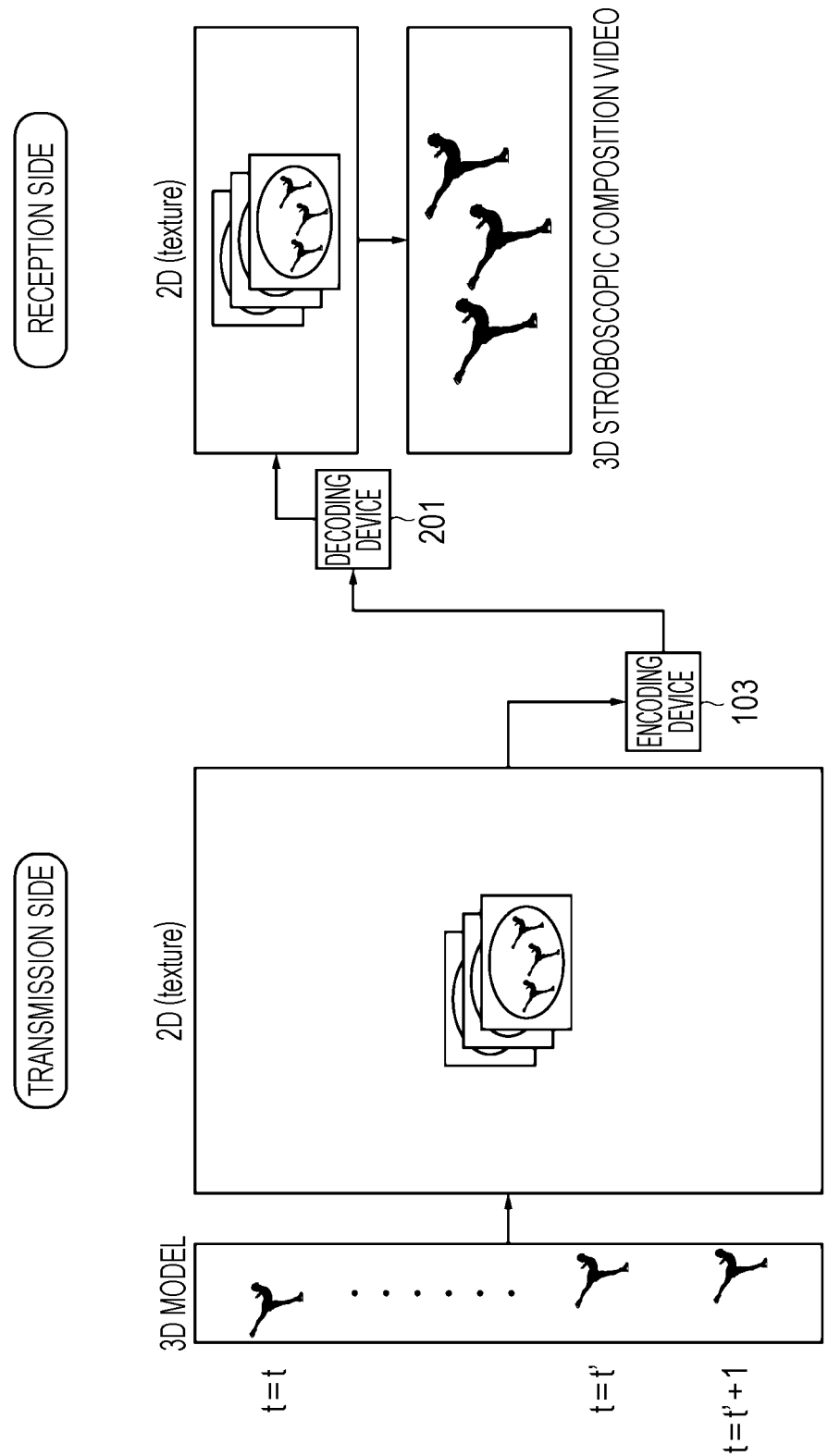

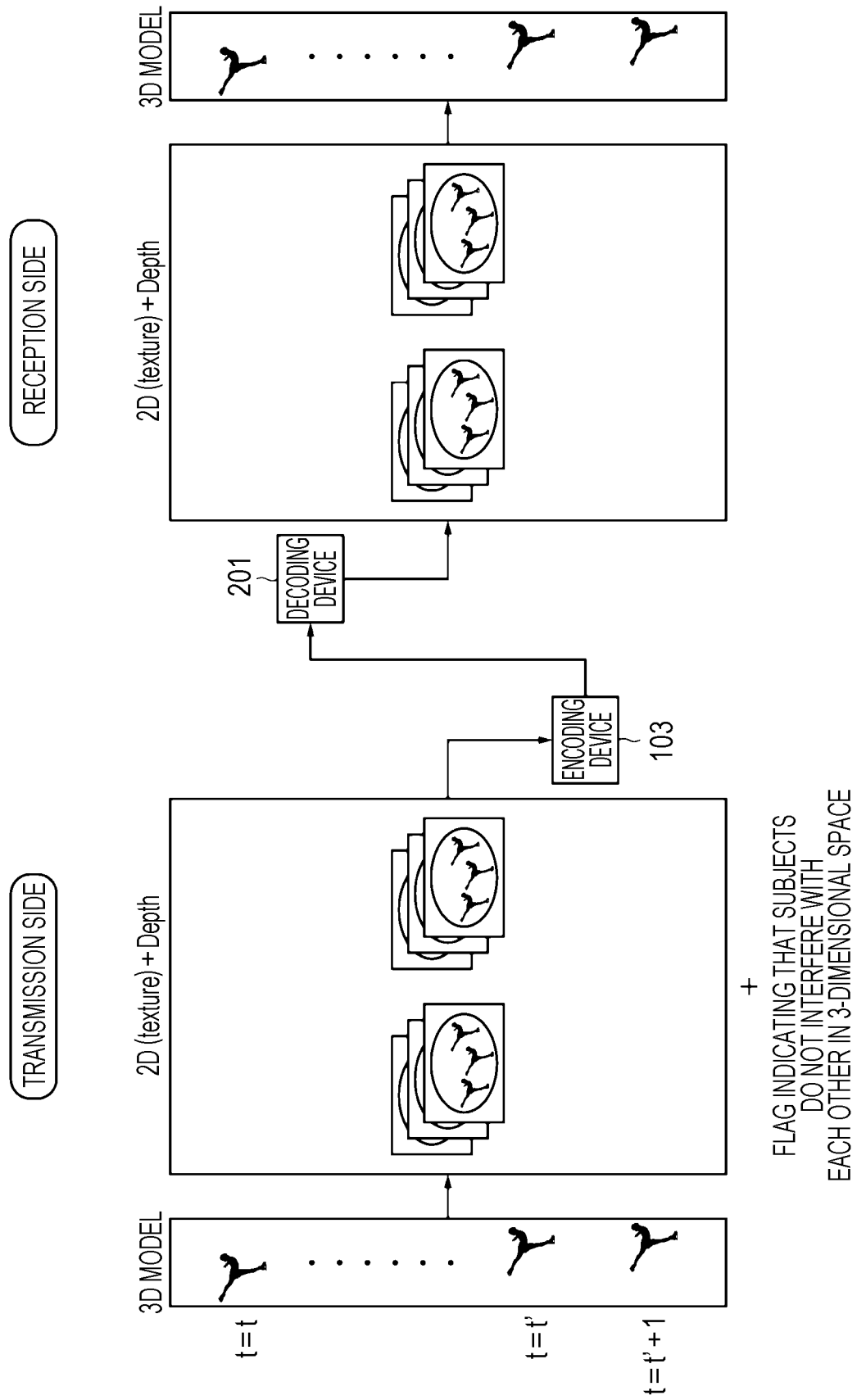

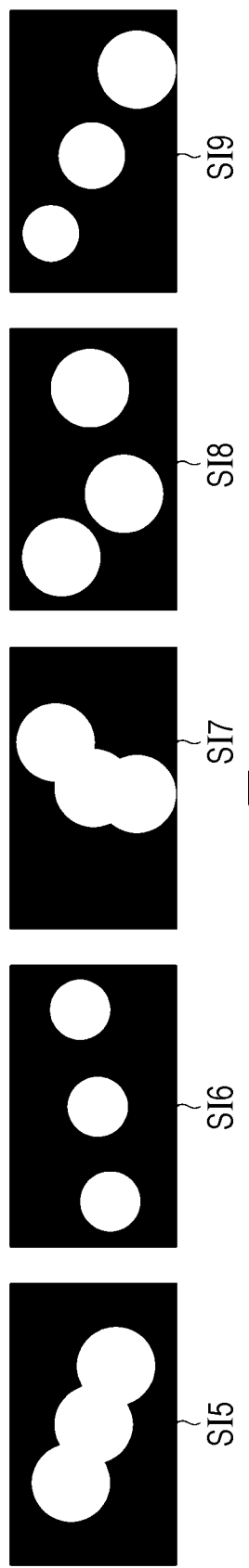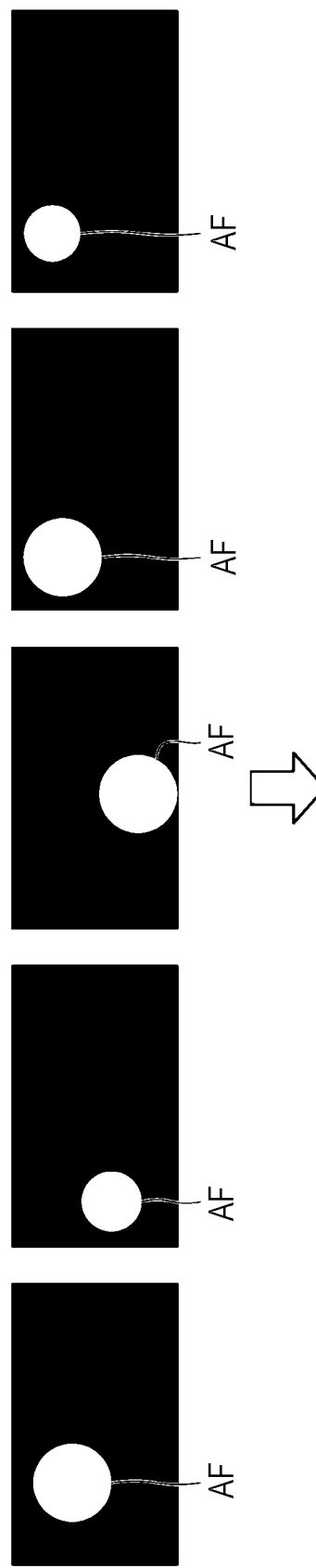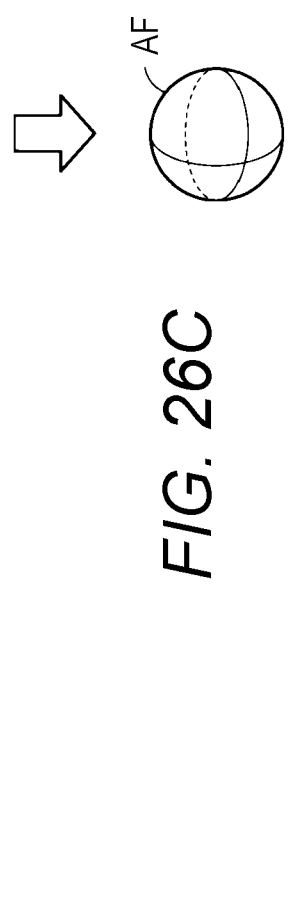
FIG. 26A
FIG. 26B
FIG. 26C

IMAGE PROCESSING DEVICE, ENCODING DEVICE, DECODING DEVICE, IMAGE PROCESSING METHOD, PROGRAM, ENCODING METHOD, AND DECODING METHOD FOR PROCESSING MULTIPLE VIDEO CAMERA IMAGE STREAMS TO GENERATE STROBOSCOPIC IMAGES

CROSS REFERENCE TO RELATED APPLICATIONS

This application is a National Stage Patent Application of PCT International Patent Application No. PCT/JP2018/027530 filed on Jul. 23, 2018 under 35 U.S.C. § 371, which claims the benefit of Japanese Priority Patent Application JP 2018-036225 filed on Mar. 1, 2018), the entire contents of which are all incorporated herein by reference.

TECHNICAL FIELD

The present disclosure relates to an image processing device, an encoding device, a decoding device, an image processing method, a program, an encoding method, and a decoding method.

BACKGROUND ART

Various processes for generating stroboscopic composition images are proposed (for example, see PTL 1).

CITATION LIST

Patent Literature

[PTL 1]
JP 2007-259477A

SUMMARY

Technical Problem

In such a field, it is desirable to perform an appropriate process for generating a desired stroboscopic composition image.

It is desirable to provide an image processing device, an encoding device, a decoding device, an image processing method, a program, an encoding method, and a decoding method for generating a stroboscopic composition video including a 3D model, for example.

Solution to Problem

The present disclosure provides, for example,
an image processing device including:
an acquisition unit that acquires a plurality of viewpoint images obtained by capturing a subject at a first time point, a plurality of viewpoint images obtained by capturing the subject at a second time point, and a plurality of viewpoint images obtained by capturing the subject at a third time point; and
an image generating unit that generates a composition 3D model including 3D models of the subject at respective time points generated on the basis of the plurality of viewpoint images of the respective time points of at least two time points of the first to third time points on the basis of subject positions of the respective time points.

The present disclosure provides, for example,
an encoding device including:
an encoding unit that generates encoded data by encoding a 3D model of a subject of each time point generated on the basis of a plurality of viewpoint images of respective time points of at least two time points of first, second, and third time points, at least one of 2D image data converted from the 3D model and depth image data indicating a depth of a subject included in the 2D image data, and a flag indicating that the 3D models of the respective time points do not interfere with each other, according to a predetermined encoding method, on the basis of the subject positions at the respective time points of the first to third time points.

The present disclosure provides, for example,
a decoding device including:
a decoding unit that decodes encoded data including a 3D model of a subject of each time point generated on the basis of a plurality of viewpoint images of respective time points of at least two time points of first, second, and third time points, at least one of 2D image data converted from the 3D model and depth image data indicating a depth of a subject included in the 2D image data, camera parameters of an image capturing device that acquires the viewpoint images, and a background image of the viewpoint image, on the basis of the subject positions at the respective positions of the first to third time points, in which
the decoding unit generates a composition 3D model including the 3D models on the basis of the background image and the camera parameters and separates the subject of a predetermined time point from an image based on the composition 3D model.

The present disclosure provides, for example,
an image processing method including:
causing an acquisition unit to acquire a plurality of viewpoint images obtained by capturing a subject at a first time point, a plurality of viewpoint images obtained by capturing the subject at a second time point, and a plurality of viewpoint images obtained by capturing the subject at a third time point; and
causing an image generating unit to generate a composition 3D model including 3D models of the subject at respective time points generated on the basis of the plurality of viewpoint images of the respective time points of at least two time points of the first to third time points on the basis of subject positions of the respective time points.

The present disclosure provides, for example,
a program for causing a computer to execute an image processing method including:
causing an acquisition unit to acquire a plurality of viewpoint images obtained by capturing a subject at a first time point, a plurality of viewpoint images obtained by capturing the subject at a second time point, and a plurality of viewpoint images obtained by capturing the subject at a third time point; and
causing an image generating unit to generate a composition 3D model including 3D models of the subject at respective time points generated on the basis of the plurality of viewpoint images of the respective time points of at least two time points of the first to third time points on the basis of subject positions of the respective time points.

The present disclosure provides, for example,
an encoding method including:
causing an encoding unit to generate encoded data by encoding a 3D model of a subject of each time point generated on the basis of a plurality of viewpoint images of respective time points of at least two time points of first, second, and third time points, at least one of 2D image data converted from the 3D model and depth image data indicating a depth of a subject included in the 2D image data, and a flag indicating that the 3D models of the respective time points do not interfere with each other, according to a predetermined encoding method, on the basis of the subject positions at the respective time points of the first to third time points.

The present disclosure provides, for example, a decoding method including:

causing a decoding unit to decode encoded data including a 3D model of a subject of each time point generated on the basis of a plurality of viewpoint images of respective time points of at least two time points of first, second, and third time points, at least one of 2D image data converted from the 3D model and depth image data indicating a depth of a subject included in the 2D image data, camera parameters of an image capturing device that acquires the viewpoint images, and a background image of the viewpoint image, on the basis of the subject positions at the respective positions of the first to third time points; and causing the decoding unit to generate a composition 3D model including the 3D models on the basis of the background image and the camera parameters and separate the subject of a predetermined time point from an image based on the composition 3D model.

The present disclosure also provides image processing apparatus responsive to successive images containing representations of an object, the image processing apparatus comprising:

an interference detecting unit to detect interference, representing an overlap between the representations of the object in the successive images;

a frame selecting unit configured to select a set of the successive images such that the detected interference between representations of the object in the selected set of images is less than a threshold interference; and a composition unit configured to generate a stroboscopic image from the selected set of images.

The present disclosure also provides an image processing method comprising:

receiving successive images containing representations of an object;

detecting interference, representing an overlap between the representations of the object in the successive images;

selecting a set of the successive images such that the detected interference between representations of the object in the selected set of images is less than a threshold interference; and generating a stroboscopic image from the selected set of images.

The present disclosure also provides image processing apparatus responsive to successive captured images of an object and to depth information indicating a three-dimensional location of the object relative to at least one distance measuring device, the image processing apparatus comprising:

a frame selecting unit configured to select a set of the successive images; and a composition unit configured to generate a stroboscopic image, with respect to a stroboscopic image viewpoint, by superposing at least parts of the selected set of images, such that amongst the selected set of images of the object, images of the object are arranged in order of distance of the object from the stroboscopic image viewpoint, in which, for a pair of images of the object at different timepoints in which an earlier image of the object has a smaller distance from the stroboscopic image viewpoint than a later image of the object, the earlier image of the object closer to the stroboscopic image viewpoint is displayed nearer the foreground than the later image of the object.

The present disclosure also provides an image processing method comprising:

receiving successive captured images of an object and depth information indicating a three-dimensional location of the object relative to at least one distance measuring device;

selecting a set of the successive images; and generating a stroboscopic image, with respect to a stroboscopic image viewpoint, by superposing at least parts of the selected set of images, such that amongst the selected set of images of the object, images of the object are arranged in order of distance of the object from the stroboscopic image viewpoint, in which, for a pair of images of the object at different timepoints in which an earlier image of the object has a smaller distance from the stroboscopic image viewpoint than a later image of the object, the earlier image of the object closer to the stroboscopic image viewpoint is displayed nearer the foreground than the later image of the object.

The present disclosure also provides image processing apparatus responsive to successive groups of images of an object captured at the same time by two or more spaced apart image capturing devices and to depth information indicating a three-dimensional location of the object relative to at least one distance measuring device, the image processing apparatus comprising:

a frame selecting unit configured to select a set of the successive image groups; and a model generating unit configured to generate a three dimensional model, for each image group in the set of image groups, from images captured at the same time by the two or more spaced apart image capturing devices and from the depth information, and to map a texture to the generated three dimensional model;

a composition unit configured to generate a stroboscopic image, with respect to a stroboscopic image viewpoint, by superposing the three dimensional models generated by the model generating unit on a predetermined background.

The present disclosure also provides an image processing method comprising:

receiving successive groups of images of an object captured at the same time by two or more spaced apart image capturing devices and depth information indicating a three-dimensional location of the object relative to at least one distance measuring device;

selecting a set of the successive image groups; and generating a three dimensional model, for each image group in the set of image groups, from images captured at the same time by the two or more spaced apart image capturing devices and from the depth information;

mapping a texture to the generated three dimensional model;

generating a stroboscopic image, with respect to a stroboscopic image viewpoint, by superposing the three dimensional models on a predetermined background.

The present disclosure also provides image processing apparatus responsive to successive images providing representations of an object and to depth information indicating a three-dimensional location of the object relative to at least one distance measuring device, the image processing apparatus comprising:

a frame selecting unit configured to select a set of the successive images; and a composition unit configured to generate a stroboscopic image, with respect to a stroboscopic image viewpoint, from the selected set of images;

in which, when the three-dimensional locations of the object are closer than a threshold separation for at least a pair of the selected images, the composition unit is configured to generate the stroboscopic image using display positions for at least some of the representations of the object for those images different from the display positions of the respective captured images.

The present disclosure also provides an image processing method comprising: receiving successive images providing representations of an object and depth information indicating a three-dimensional location of the object relative to at least one distance measuring device;

selecting a set of the successive images; and generating a stroboscopic image, with respect to a stroboscopic image viewpoint, from the selected set of images;

in which, when the three-dimensional locations of the object are closer than a threshold separation for at least a pair of the selected images, the generating step comprises generating the stroboscopic image using display positions for at least some of the representations of the object for those images different from the display positions of the respective captured images.

The methods defined above may be implemented by computer software which, when executed by a computer, causes the computer to perform the respective method. Such computer software may, for example, be stored by a non-transitory machine-readable medium.

Advantageous Effects of Invention

According to at least one embodiment of the present disclosure, it is possible to generate a stroboscopic composition video including a 3D model. Note that the present disclosure is not necessarily limited to the advantageous effects described herein, and may have any advantageous effect described in the present disclosure. Moreover, the exemplified advantageous effects are not intended to limit the content of the present disclosure.

BRIEF DESCRIPTION OF DRAWINGS

FIG. 8 is a flowchart illustrating the flow of a processing example performed by the image processing device according to an embodiment.

FIG. 9 is a diagram for describing an example of a data set according to an embodiment.

FIG. 12 is a diagram referred to when describing another example of a process of determining the presence of movement of a subject.

FIG. 13 is a diagram referred to when describing another example of a process of determining the presence of movement of a subject.

FIG. 20 is a diagram for describing another example of the processing performed by the transmission system according to an embodiment.

FIG. 21 is a diagram for describing another example of the processing performed by the transmission system according to an embodiment.

FIGS. 26A to 26C are diagrams referred to when describing a process of extracting a specific silhouette from a silhouette image in which a plurality of silhouette images are composed.

DESCRIPTION OF EMBODIMENTS

Hereinafter, embodiments of the present disclosure and the like will be described with reference to the drawings. Note that the description will be given in the following order.

<Technology Related to Embodiment and Problems to be Taken into Consideration>

Embodiment

[Configuration Example of Image Processing Unit]
[Flow of Processes of Embodiment]
[Transmission System]
[Display Example]
<Modification>

Technology Related to Embodiment and Problems to be Taken into Consideration

First, a technology related to an embodiment and problems to be taken into consideration will be described in order to facilitate understanding of the present disclosure. Note that an overview of the embodiment will be also discussed within a range necessary for description.

Generally, stroboscopic photography using an image capturing device (a camera) is performed. Stroboscopic photography is a method of superimposing and composing frames (for example, including representations of or images of an object or multiple objects) ranging between certain time points t and t', of a video photographed by a fixed-point camera in order to express and understand the trajectory or the like of a moving subject. 2-dimensional images (hereinafter appropriately referred to as 2D stroboscopic composition videos) obtained by stroboscopic photography are displayed to users.

One of problems to be taken into consideration to obtain the 2D stroboscopic composition video is that it incurs manual operations. For example, although it is possible to express the movement of a subject without any overlap by thinning out frames at a constant time interval in a case where a moving speed of the subject is constant, inappropriate overlaps may occur when the moving speed of the subject decreases. In such a case, a user has to manually perform an operation of select frames to be thinned out. Therefore, it is desirable that a stroboscopic composition video is generated automatically without such a manual operation.

Incidentally, it is possible to generate 3D data corresponding to a 3-dimensional shape of a subject using pieces of 2-dimensional image data or the like obtained from a plurality of image capturing devices arranged to surround the subject. In the present embodiment, it is possible to generate a stroboscopic composition video (hereinafter appropriately referred to as a 3D stroboscopic composition video) using a 3D model which is a 3-dimensional shape of the subject (the details of these processes will be described later).

Figure 1:
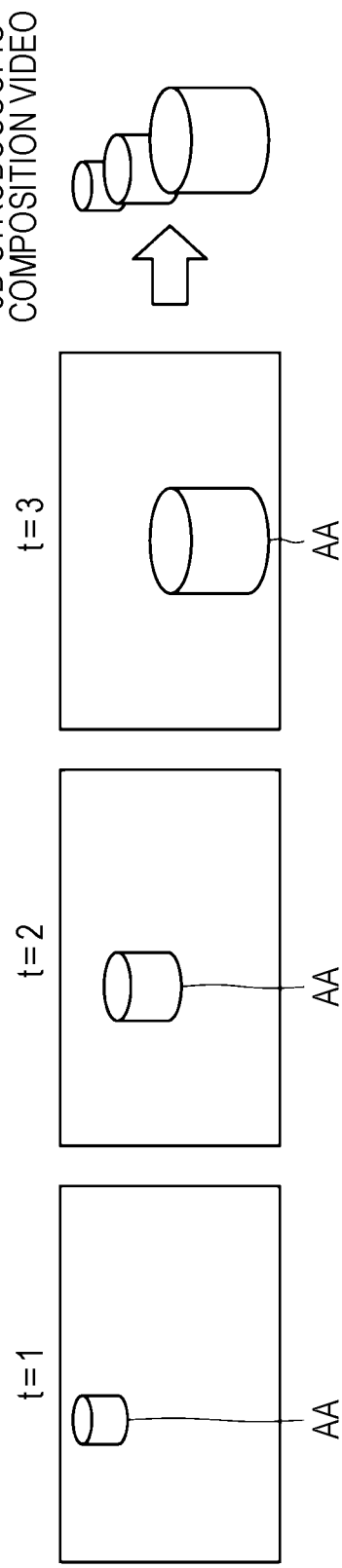
FIGS. 1A and 1B are diagrams referred to when describing problems to be taken into consideration in an embodiment.

As one example, a method of generating a 3D stroboscopic composition video by superimposing 3D models at respective time points on the basis of time information may be used. A problem to be taken into consideration in this method will be described. As illustrated in FIG. 1A, a case where an object (a 3-dimensional object) AA moves toward a viewer at time points t1 to t3 will be considered. Note that time point t1 precedes time points t2 and t3 and time point t2 precedes time point t3. In addition, although FIGS. 1A and 1B schematically illustrates the cylindrical object AA, the object AA may have an arbitrary shape.

FIG. 1B illustrates a 3D stroboscopic composition video in which the objects AA at respective time points are superimposed on the basis of time information. In a case where the object AA moves toward a viewer, no problem occurs even when a 3D stroboscopic composition video is generated on the basis of the time information only.

Figure 2:
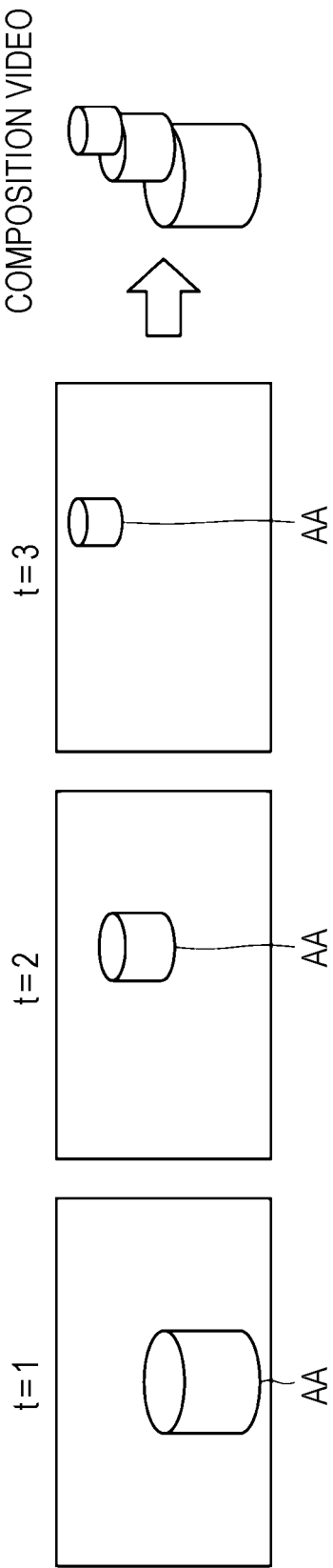
FIGS. 2A and 2B are diagrams referred to when describing problems to be taken into consideration in an embodiment.

Next, as illustrated in FIG. 2A, a case where the object AA moves away from a viewer at time points t1 to t3 will be considered. In such a case, if a 3D stroboscopic composition video is created on the basis of time information only, a 3D stroboscopic composition video in which objects later in time are sequentially overwritten is obtained. For example, as illustrated in FIG. 2B, the object AA located near a viewer at an earlier time point is displayed on a backward side of the 3D stroboscopic composition video and the object AA located away from the viewer at a later time point is displayed on a forward side thereof, which is inappropriate. Therefore, this needs to be taken into consideration.

Figure 3:
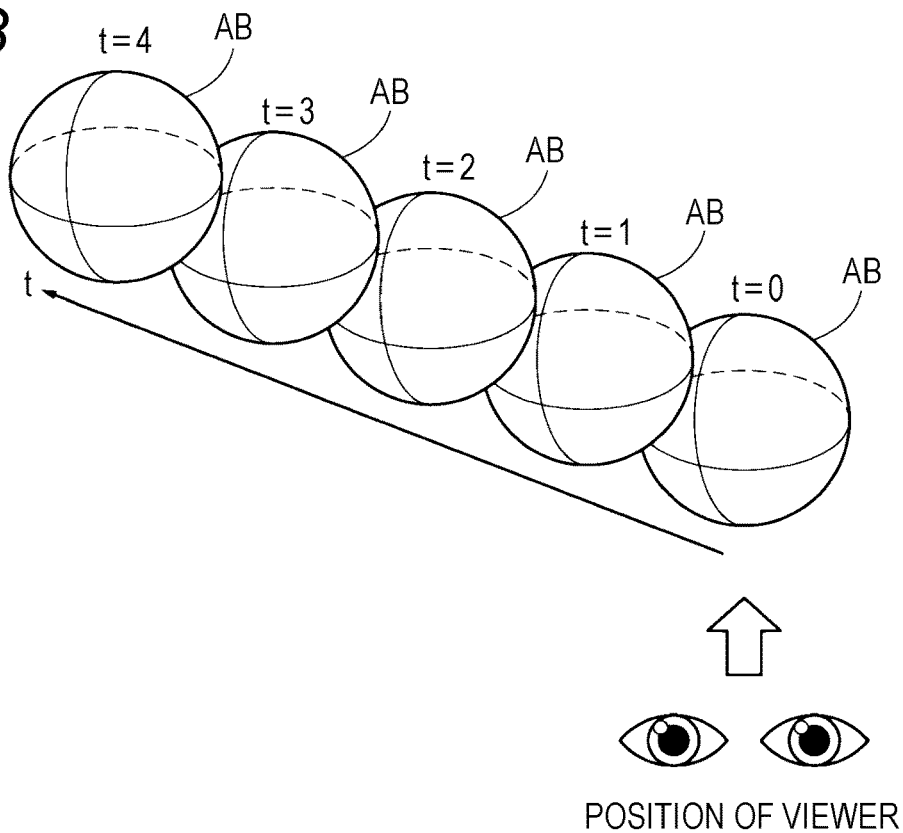
FIG. 3 is a diagram referred to when describing problems to be taken into consideration in an embodiment.

FIG. 3 is a diagram illustrating a state in which, in a case where a 3D stroboscopic composition video is generated preferentially on the basis of the time information, 3-dimensional positions of objects are not correctly represented in a superimposed manner. As illustrated in FIG. 3, a case where a spherical object AB moves away from the position of a viewer with the lapse of time (time points t0, t1, . . . , t4) will be considered. When a 3D stroboscopic composition video is generated preferentially on the basis of time information, a video in which an object AB at time point t4 (that is, the object AB located away from the viewer) is displayed as a main subject is obtained.

Figure 4:
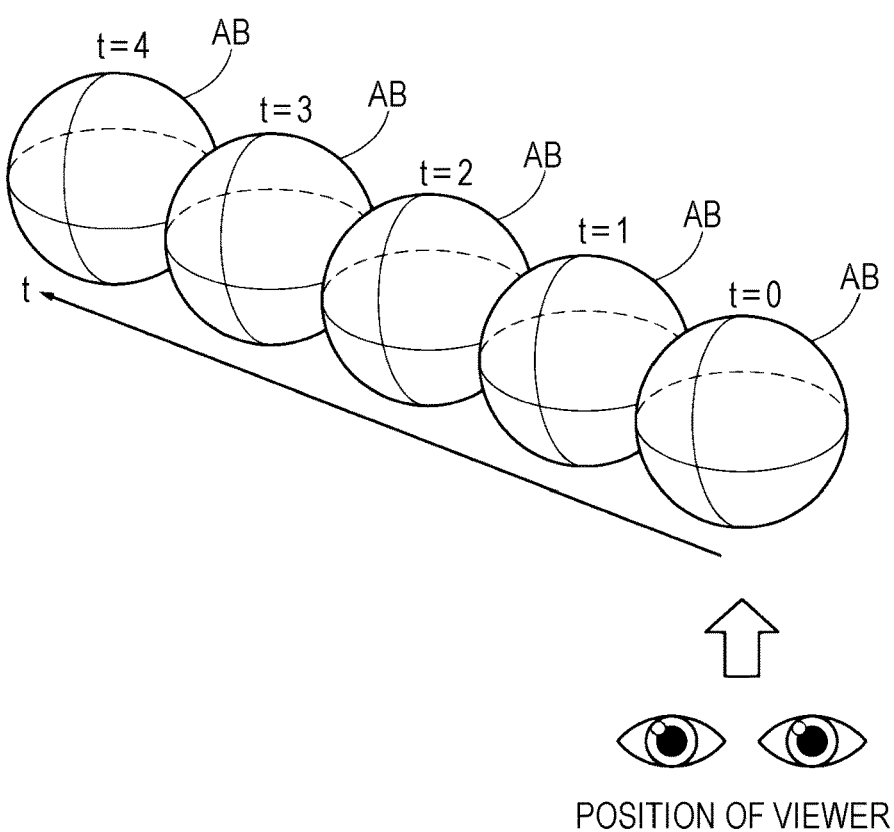
FIG. 4 is a diagram referred to when describing problems to be taken into consideration in an embodiment.

Therefore, in the present embodiment, as illustrated in FIG. 4, an object (the object AB at time point t0 in this example) located closest to the subject from a viewer is displayed at the front side. Although the details are described later, in the present embodiment, depth information of the object AB is used to generate the 3D stroboscopic composition video. Such a technique, which will be described further below, provides an example of an image processing method comprising: receiving successive captured images of an object and depth information indicating a three-dimensional location of the object relative to at least one distance measuring device; selecting a set of the successive images; and generating a stroboscopic image, with respect to a stroboscopic image viewpoint, by superposing at least parts of the selected set of images, such that amongst the selected set of images of the object, images of the object are arranged in order of distance of the object from the stroboscopic image viewpoint, in which, for a pair of images of the object at different timepoints in which an earlier image of the object has a smaller distance from the stroboscopic image viewpoint than a later image of the object, the earlier image of the object closer to the stroboscopic image viewpoint is displayed nearer the foreground than the later image of the object.

Figure 5A:
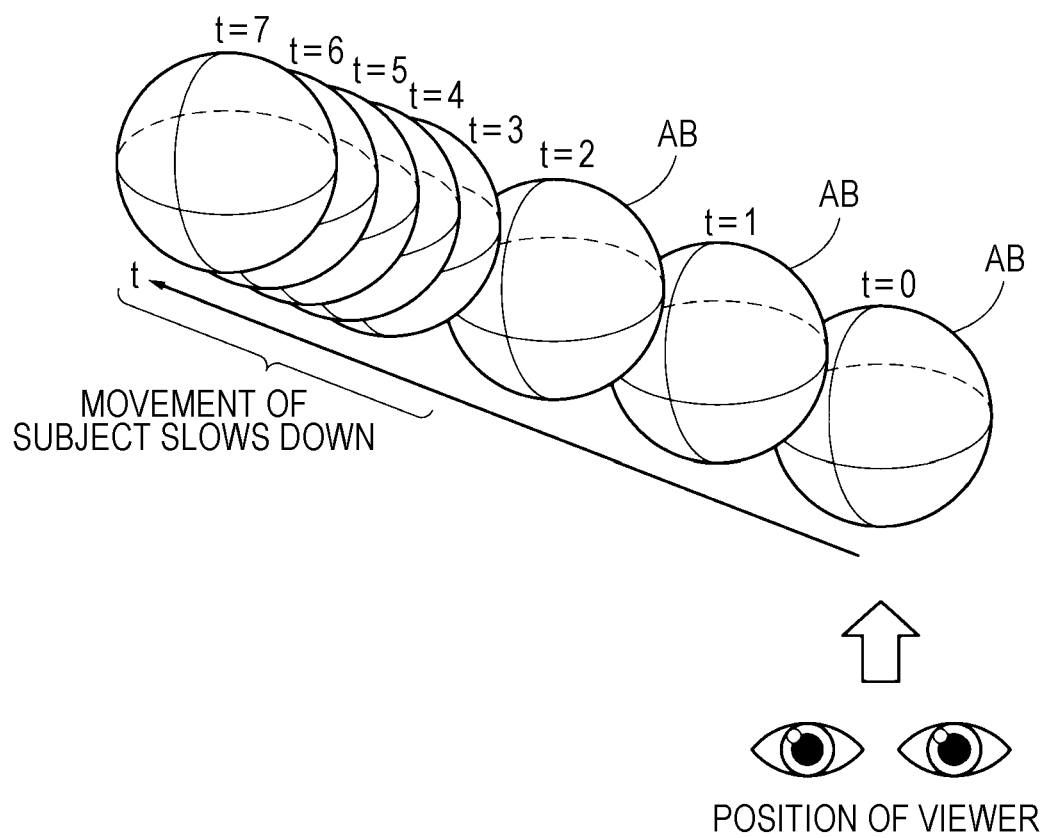
FIGS. 5A and 5B are diagrams referred to when describing problems to be taken into consideration in an embodiment.
Figure 5B:
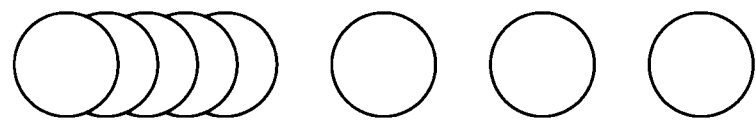

Another problem to be taken into consideration when generating a 3D stroboscopic composition video using time information only will be described. As illustrated in FIG. 5A, a case where a moving speed of an object AB changes will be considered. For example, as illustrated in FIG. 5A, a case where the moving speed of the object AB changes at time point t3 (specifically, a case where the moving speed decreases) will be considered. FIG. 5B is a lateral view of the trajectory of the object AB illustrated in FIG. 5A. In such a case, when a 3D stroboscopic composition video is generated by superimposing the object AB simply at a constant interval, in a case where the moving speed of the object AB changes, the objects AB at respective time points interfere with each other, and a partially inappropriate video is obtained.

Figure 6A:
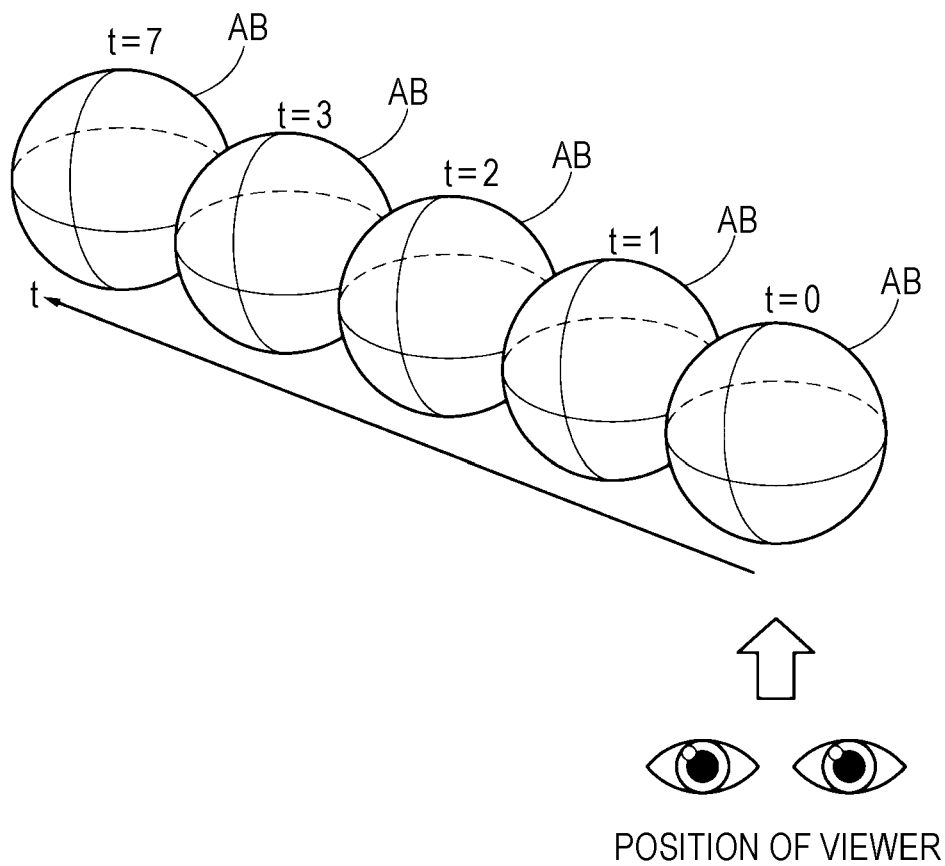
FIGS. 6A and 6B are diagrams referred to when describing problems to be taken into consideration in an embodiment.
Figure 6B:
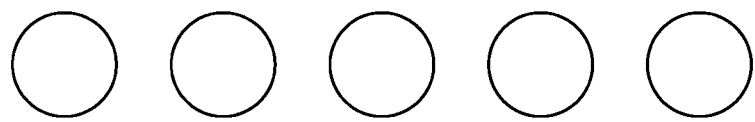

Therefore, in the present embodiment, it is determined whether the objects AB (or in other words, the representations of the object AB in the successive images) at respective time points interfere with each other 3-dimensionally, for example, and the objects are not superimposed in a case where interference occurs and the objects are superimposed in a case where interference does not occur. This is an example of detecting interference, representing an overlap between the representations of the object in the successive images. By this processing, as schematically illustrated in FIGS. 6A and 6B, it is possible to obtain an appropriate 3D stroboscopic composition video, for example by selecting a set of the successive images such that the detected interference between representations of the object in the selected set of images is less than a threshold interference. Note that no interference may mean that the degree of interference is 0 and may mean that the degree of interference is equal to or smaller than a threshold (for example, 10%). Therefore, in examples, the threshold interference can represent zero interference. In other examples, the threshold interference can represent an overlap of a predetermined proportion of the image area (for example, the larger image area in the case that the object size is different between representations) of the representations of the object. For example, the predetermined proportion may be 10%.

A stroboscopic image can then be generated from the selected set of images.

This therefore provides an example of an image processing method comprising: receiving successive images containing representations of an object; detecting interference, representing an overlap between the representations of the object in the successive images;
selecting a set of the successive images such that the detected interference between representations of the object in the selected set of images is less than a threshold interference; and generating a stroboscopic image from the selected set of images.

In addition, generally, there is known a video representation method called timelapse (bullet-time) of slicing a certain time point t so that viewers can watch that moment from free viewpoints. In related art, viewers watch a subject at a certain time point t only from free viewpoints. However, according to the present embodiment, since a 3D stroboscopic composition video obtained by composing 3D models of time points t to t' is generated, it is possible to achieve a timelapse expression at time points t to t'.

With the above-described problems to be taken into consideration in mind, embodiments of the present disclosure will be described in detail.

Embodiment

[Configuration Example of Image Processing Device]

In the present embodiment, a free-viewpoint image capturing system including a plurality of (at least two) image capturing devices arranged to surround a subject is used. As an example, the free-viewpoint image capturing system has six image capturing devices. The six image capturing devices obtain images (viewpoint images) corresponding to arrangement positions (viewpoints) of the respective image capturing devices by capturing 2-dimensional image data of moving images of subjects which are at least partially identical at synchronized timings.

Furthermore, the free-viewpoint image capturing system according to the present embodiment has a distance measuring device capable of measuring a distance to a subject. The distance measuring device is provided in each image capturing device, for example, and generates depth image data of the same viewpoint, for example, as the image capturing device. Only some of the six image capturing devices may have the distance measuring device. Moreover, the distance measuring device may be a different device from the image capturing device. In this case, the distance measuring device may generate depth image data of a different viewpoint from the image capturing device. The free-viewpoint image capturing system according to the present embodiment has four distance measuring devices. The distance measuring device may be a time-of-flight (TOF) or a light-detection-and-ranging (LIDAR), for example. A camera (a stereo camera) that obtains distance information may be used as the distance measuring device.

This therefore provides an example comprising a set of devices providing: two or more image capturing devices, arranged so that the successive images comprise groups of images captured from different respective image capture viewpoints; and one or more distance measuring devices. Note that within the set of devices, one or more of the image capturing devices could include the functionality of the distance measuring devices (for example, in the form of stereoscopic or other depth cameras) and/or the distance measuring device(s) could be separate device(s) to the image capturing devices.

The multiple image capturing devices may capture successive groups of images (such as one image pre device at any time) which may be synchronized together or between which the apparatus to be described below may detect a synchronization shift.

Each image capturing device has an image processing device as well as known constituent elements such as an image capturing element, and a control unit such as a CPU, and a display. Note that only some of the image capturing devices may have the image processing device. Moreover, the image processing device may be an independent device such as a personal computer capable of communicating with each image capturing device in a wired or wireless manner rather than being embedded in the image capturing device.

Figure 7:
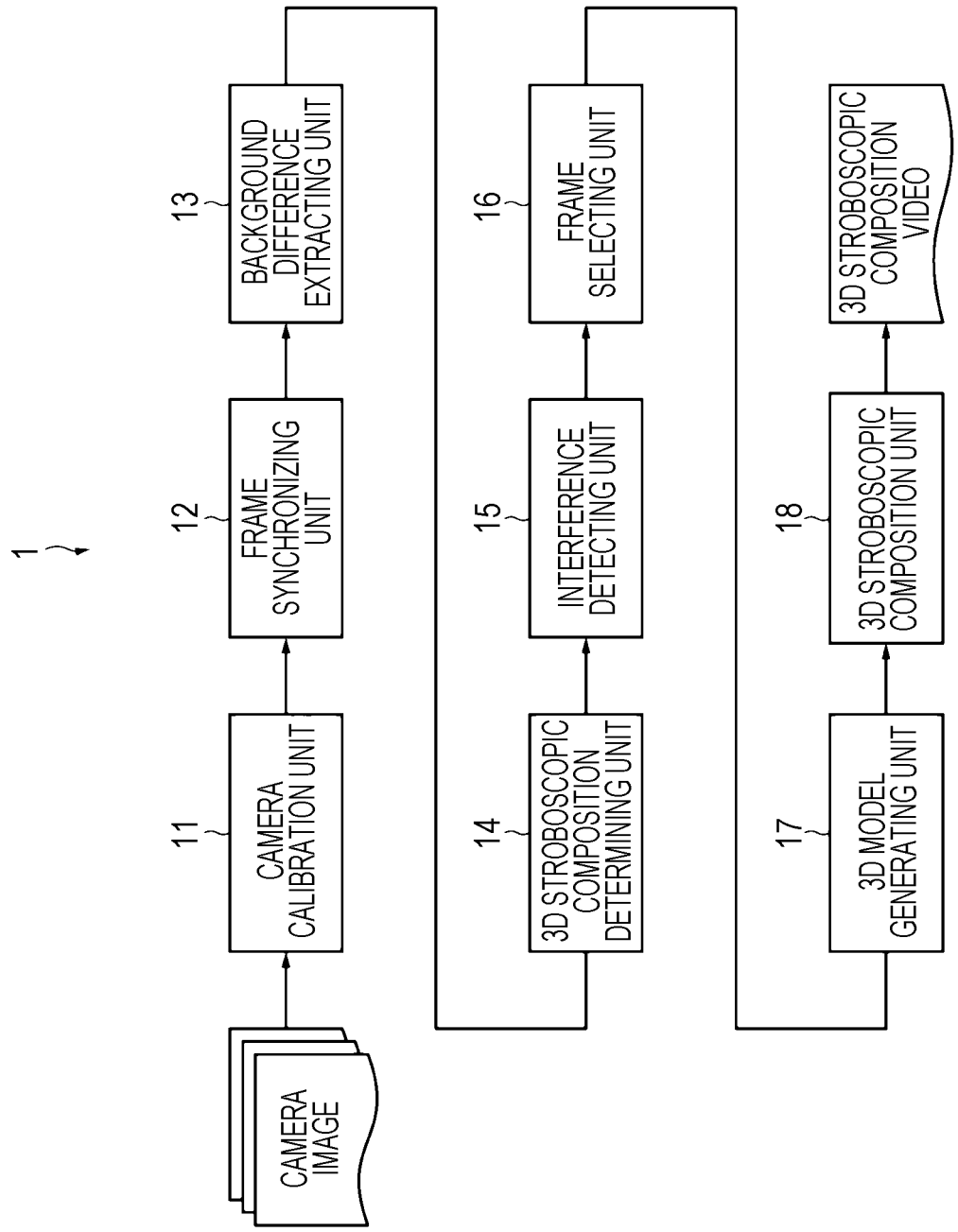
FIG. 7 is a block diagram for describing a configuration example of an image processing device according to an embodiment.

FIG. 7 is a block diagram for describing a configuration example of an image processing device (an image processing device 1) according to the present embodiment. For example, the image processing device may be implemented as a programmable processor or processing apparatus operating under the control of computer software which, when executed by such a device, causes the device to perform one or more of the methods described here. The computer software may be stored by a non-transitory machine-readable medium such as a magnetic or optical disc, a flash memory, a read only memory or the like. For example, the image processing device 1 has a camera calibration unit 11, a frame synchronizing unit 12, a background difference extracting unit 13, a 3D stroboscopic composition determining unit 14, an interference detecting unit 15, a frame selecting unit 16, a 3D model generating unit 17, and a 3D stroboscopic composition unit 18.

The camera calibration unit 11 receives six pieces of 2-dimensional image data (2-dimensional image data acquired by six image capturing devices) at a predetermined time point. For example, the camera calibration unit 11 receives a plurality of (for example, six in the present embodiment) viewpoint images obtained by capturing a subject at a certain time point t1, six viewpoint images obtained by capturing the image at another time point t2, and six viewpoint images obtained by capturing the subject at still another viewpoint t3. Note that, in the present embodiment, although the camera calibration unit 11 functions as an acquisition unit, an interface to which the viewpoint images are input may function as an acquisition unit. In addition, in the present embodiment, although it is assumed that the plurality of viewpoint images obtained by capturing the subject at time point t1 have no synchronization shift, the viewpoint images may have a synchronization shift. The same is true for the plurality of viewpoint images obtained by capturing the subject at time points t2 and t3.

A 3D stroboscopic composition video is output from the 3D stroboscopic composition unit 18. That is, the 3D stroboscopic composition unit 18 generates a composition 3D model (that is, a 3D stroboscopic composition video) including a 3D model of the subject at respective time points (at least two time points of the time points t1 to t3) generated on the basis of a plurality of viewpoint images of at least two time points of the time points t1 to t3 on the basis of subject positions at the time points t1 to t3, for example.

The respective constituent elements will be described. The camera calibration unit 11 performs calibration using camera parameters with respect to the input 2-dimensional image data. Note that examples of the camera parameters include internal parameters and external parameters. Internal parameters are parameters unique to a camera and are obtained by calculating distortion of a camera lens, an inclination (a distortion aberration coefficient) between an image sensor and a lens, an image center, and an image (pixel) size, for example. The use of internal parameters enables an image distorted by a lens optical system to be corrected to a correct image. On the other hand, external parameters are obtained by calculating a positional relation between a plurality of cameras when there are a plurality of cameras as in the present embodiment. The external parameters are obtained by calculating a center coordinate (translation) of a lens and a direction (rotation) of a lens optical axis in the world coordinate system.

A Zhang's method which uses chessboards is known as a method related to camera calibration. Naturally, methods other than the Zhang's method can be also used as a camera calibration method. For example, a method of capturing images of a 3-dimensional object to obtain parameters, a method of capturing images of two emitted light beams directly toward a camera to obtain parameters, a method of projecting feature points using a projector to obtain parameters using the projection images, a method of sweeping a light emitting diode (LED) light to capture images of point light sources to obtain parameters may be used, and the like.

The frame synchronizing unit 12 sets one of the six image capturing devices as a base image capturing device and sets the remaining image capturing devices as reference image capturing devices. The frame synchronizing unit 12 detects a synchronization shift of 2-dimensional image data of the reference cameras with respect to the base camera in msec order for each reference camera on the basis of the 2-dimensional image data of the base camera and the 2-dimensional image data of the reference cameras supplied from the camera calibration unit 11. Information regarding the detected synchronization shift is stored and a correction process based on the information is performed appropriately. (Therefore in these examples, a frame synchronising unit 12 may be used to detect a synchronisation shift between the images of a group.)

The background difference extracting unit 13 separates a subject from a background for each piece of 2-dimensional image data to generate a 2-value image called a silhouette image in which the silhouette of the subject is represented as black and the other region is represented as white, for example. The background difference extracting unit 13 may generate the silhouette image on a real-time basis and may generate the silhouette image of each frame that forms a moving image after capturing of the moving image ends.

The 3D stroboscopic composition determining unit 14 determines whether 3D stroboscopic composition can be performed by the 3D stroboscopic composition unit 18 on a rear stage. In the present embodiment, in a case where movement of a subject is present, the 3D stroboscopic composition determining unit 14 determines that 3D stroboscopic composition can be performed. A case where movement of a subject is present is a case where a movement amount of the subject is a predetermined amount or more. Note that a threshold for determining the presence of movement is set appropriately according to the size, the shape, and the like of a subject. Note that a 3D stroboscopic composition video may be generated even in a case where movement of a subject is not present.

Therefore in examples, a determining unit can be provided that determines presence of movement of the subject according to a change in the position of the subject, wherein the composition unit is configured to generate the stroboscopic image in a case where the determining unit determines that movement of the subject is present.

The interference detecting unit 15 detects a degree of interference of a subject on the basis of a silhouette image generated by the background difference extracting unit 13 or a 3D model based on the silhouette image. In the present embodiment, a 3D stroboscopic composition video is generated in a case where the degree of interference is 0 (that is, the subjects do not interfere with each other) and in a case where the degree of interference is equal to or smaller than a predetermined value (hereinafter, these cases will be collectively referred to as a case where the degree of interference is equal to or smaller than a predetermined value).

The frame selecting unit 16 selects a frame in which the interference detecting unit 15 has determined that the degree of interference is equal to or smaller than a predetermined value.

The 3D model generating unit 17 performs modeling based on visual hulls or the like using the 2-dimensional image data and the depth image data based on the viewpoints of the respective image capturing devices and the parameters of the respective image capturing devices to create a mesh. Then, the 3D model generating unit 17 performs texture mapping on the mesh on the basis of predetermined color information to generate a 3D model which is the result of mapping. For example, the 3D model generating unit 17 generates a 3D model on a real-time basis using the 2-dimensional image data and the depth image data based on the viewpoints of the respective image capturing devices and the parameters of the respective image capturing devices at a predetermined time point.

Therefore, in examples, the model generating unit 17 can be configured to detect the intersection of visual hulls corresponding to respective images of a group of images.

In examples, the model generating unit 17 can be configured to generate a mesh representing the object and to perform texture mapping on the generated mesh.

The device 1, in this context, therefore provides an example of image processing apparatus responsive to successive groups of images of an object captured at the same time by two or more spaced apart image capturing devices and to depth information indicating a three-dimensional location of the object relative to at least one distance measuring device, the image processing apparatus comprising: a frame selecting unit 16 configured to select a set of the successive image groups; and a model generating unit 17 configured to generate a three dimensional model, for each image group in the set of image groups, from images captured at the same time by the two or more spaced apart image capturing devices and from the depth information, and to map a texture to the generated three dimensional model; a composition unit 18 configured to generate a stroboscopic image, with respect to a stroboscopic image viewpoint, by superposing the three dimensional models generated by the model generating unit on a predetermined background.

In examples, the device 1 can perform an image processing method comprising: receiving successive groups of images of an object captured at the same time by two or more spaced apart image capturing devices and depth information indicating a three-dimensional location of the object relative to at least one distance measuring device; selecting a set of the successive image groups; generating a three dimensional model, for each image group in the set of image groups, from images captured at the same time by the two or more spaced apart image capturing devices and from the depth information;
mapping a texture to the generated three dimensional model; generating a stroboscopic image, with respect to a stroboscopic image viewpoint, by superposing the three dimensional models on a predetermined background.

The 3D stroboscopic composition unit 18 displays a plurality of 3D models generated by the 3D model generating unit 17 so as to be superimposed on a predetermined background to thereby generate and output a 3D stroboscopic composition video.

The apparatus of FIG. 7 therefore provides an example of image processing apparatus responsive to successive images containing representations of an object, the image processing apparatus comprising: an interference detecting unit (such as the unit 15) to detect interference, representing an overlap between the representations of the object in the successive images; a frame selecting unit (such as the unit 16) configured to select a set of the successive images such that the detected interference between representations of the object in the selected set of images is less than a threshold interference; and a composition unit (such as the unit 18) configured to generate a stroboscopic image from the selected set of images.

Note that the generated 3D stroboscopic composition video is displayed on a display included in the image capturing device, for example. The 3D stroboscopic composition video may be displayed on a display included in a different device from the image capturing device. Examples of such a display include a display of a personal computer, a display of a television device, a display of a device that creates virtual reality (VR), and the like. Moreover, the display may be a so-called projection mapping device that projects an object present in a space and projects a video on the object.

[Flow of Processes of Embodiment]

Next, an example of the flow of processes performed in the present embodiment will be described. FIG. 8 is a flowchart illustrating the flow of the processes. The processes in the flowchart illustrated in FIG. 8 are performed by the image processing device 1 unless particularly stated otherwise.

(Overview of Processing)

In step ST11, data including the 2-dimensional image data acquired by the free-viewpoint image capturing system (hereinafter appropriately referred to as a data set) is input to the image processing device 1. In step ST12, the image processing device 1 determines the movement of a subject.

In step ST13, the image processing device 1 determines whether 3D stroboscopic composition can be performed on the basis of the determination result in step ST12. Here, in a case where it is not determined that 3D stroboscopic composition can be performed, the flow proceeds to step ST16 and the process related to 3D stroboscopic composition is not performed. In a case where it is determined in step ST13 that 3D stroboscopic composition can be performed, the flow proceeds to step ST14. In step ST14, the image processing device 1 selects a modeling target frame. In step ST15, the image processing device 1 performs 3D stroboscopic composition on the basis of the frame selected in step ST14 to generate a 3D stroboscopic composition video.

(Process of Step ST11)

The respective processes will be described in detail. In step ST11, a data set is input to the image processing device 1. The data set of the present embodiment includes 2-dimensional image data acquired by the free-viewpoint image capturing system, depth information of a subject acquired by the distance measuring device, and camera parameters.

FIG. 9 illustrates an example of 2-dimensional image data acquired by the free-viewpoint image capturing system. FIG. 9 illustrates an example of the 2-dimensional image data obtained by six image capturing devices which perform capturing in a period between the time points t0 and t7 in a synchronized manner. In this example, the subject AD is a person. For example, pieces of 2-dimensional image data IM10, IM20, . . . , IM60 are obtained by the synchronized capturing of the six image capturing devices at time point t0. Pieces of 2-dimensional image data IM17, IM27, . . . , IM67 are obtained by the synchronized capturing of the six image capturing devices at time point t7. Note that the time points t are set according to the frame rate (for example, 60 frames per second (fps), 120 fps, and the like) of the image capturing device. (So in these examples, the two or more image capturing devices are arranged to capture images in synchronism with one another.)

(Process of Step ST12)

In step ST12, the image processing device 1 determines movement of the subject. Specifically, the 3D stroboscopic composition determining unit 14 determines movement of the subject on the basis of the depth information (distance information) of the subject included in the data set.

Figure 10A:
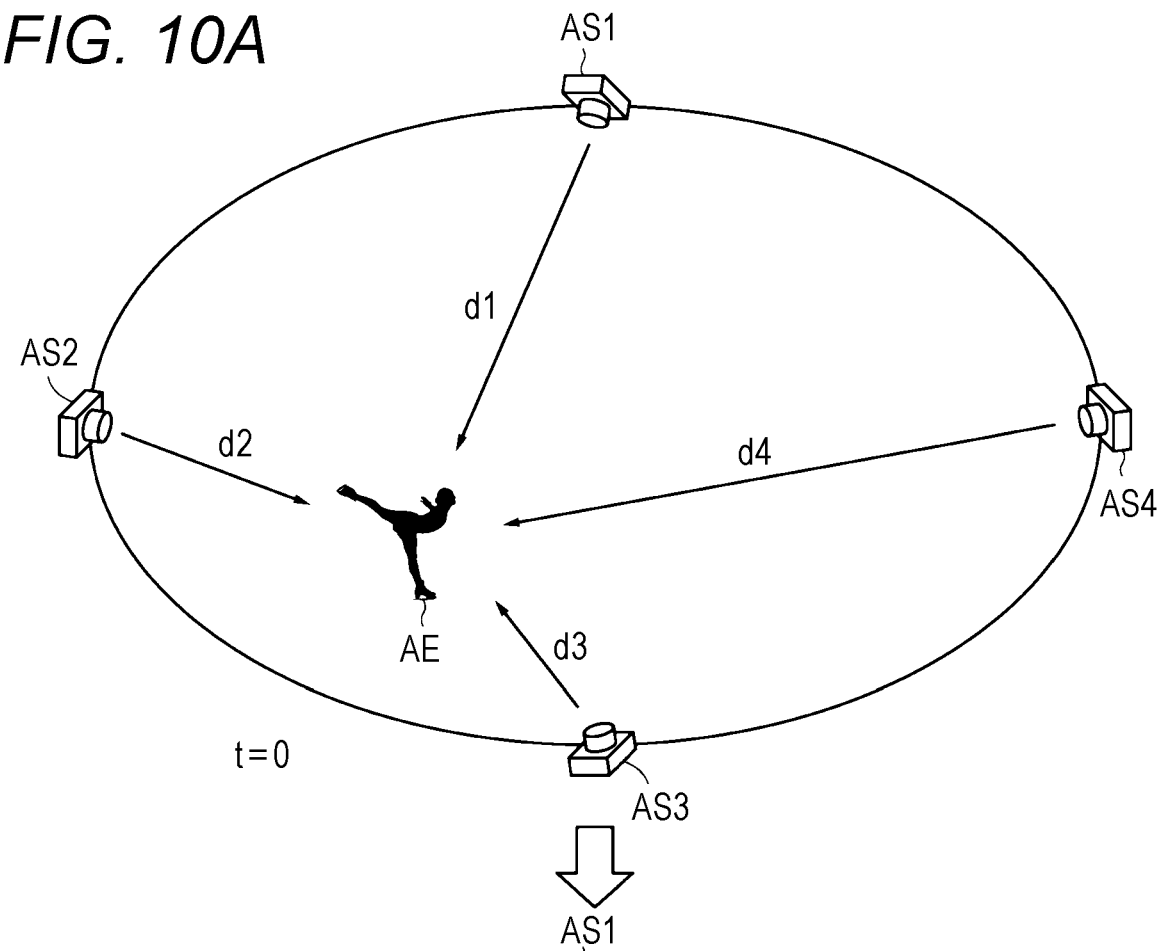
FIGS. 10A and 10B are diagrams referred to when describing a process of determining the presence of movement of a subject.
Figure 10B:
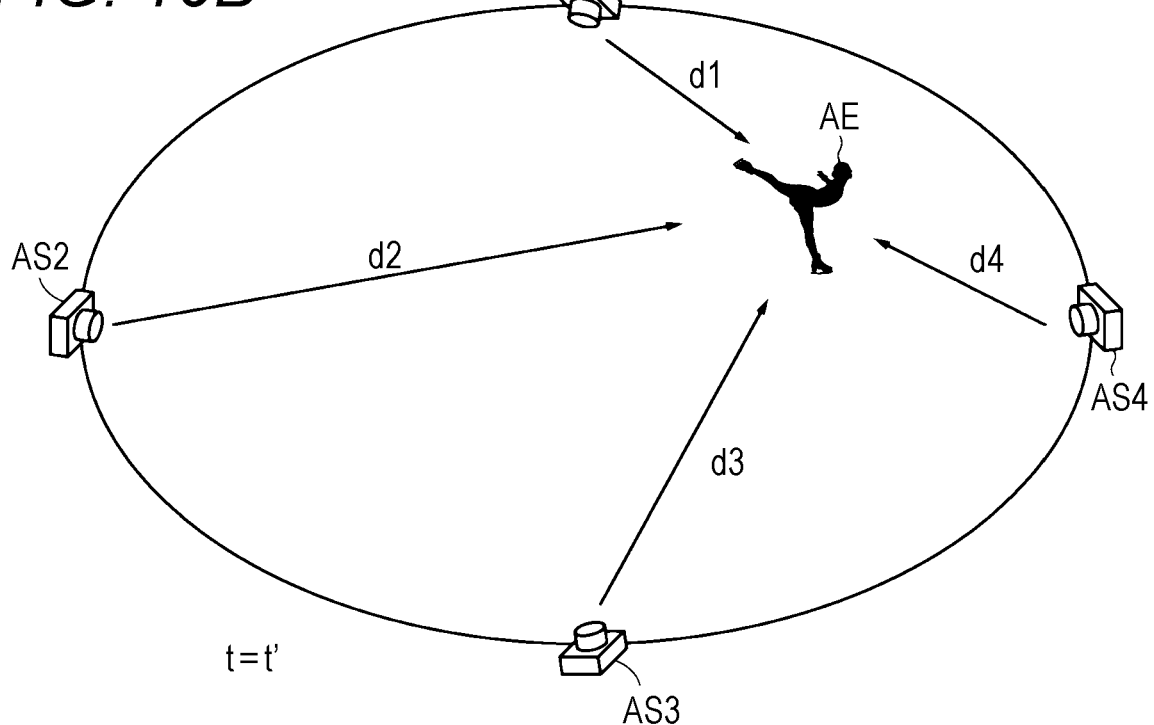

FIGS. 10A and 10B are diagrams for describing an example of a process of determining movement of the subject performed by the 3D stroboscopic composition determining unit 14. AS1 to AS4 in FIGS. 10A and 10B indicate the distance measuring devices, respectively. In addition, in FIGS. 10A and 10B, a subject AE who is a skater on a skating rink is illustrated as an example.

As illustrated in FIG. 10A, at a certain time point t0, depth information d1 is measured by the distance measuring device AS1. Similarly, depth information d2 is measured by the distance measuring device AS2, depth information d3 is measured by the distance measuring device AS3, and depth information d4 is measured by the distance measuring device AS4.

Figure 11A:
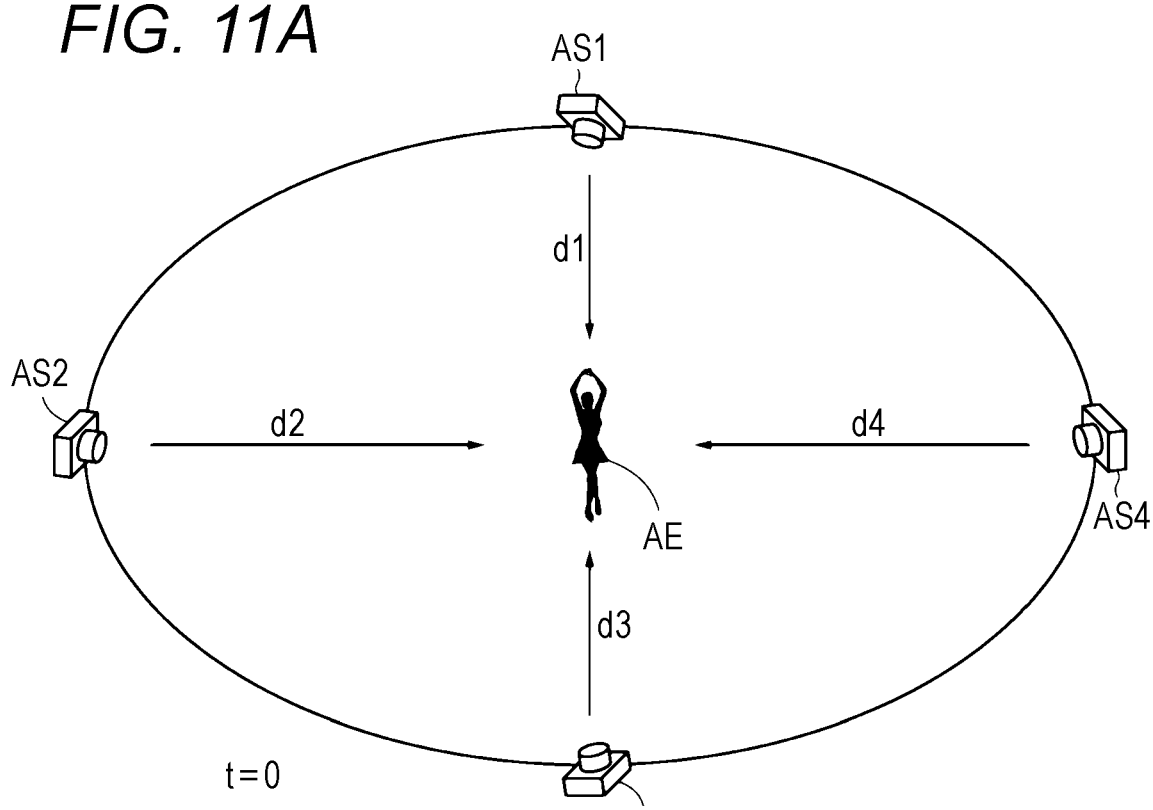
FIGS. 11A and 11B are diagrams schematically illustrating a case where it is determined that movement of a subject is not present.
Figure 11B:
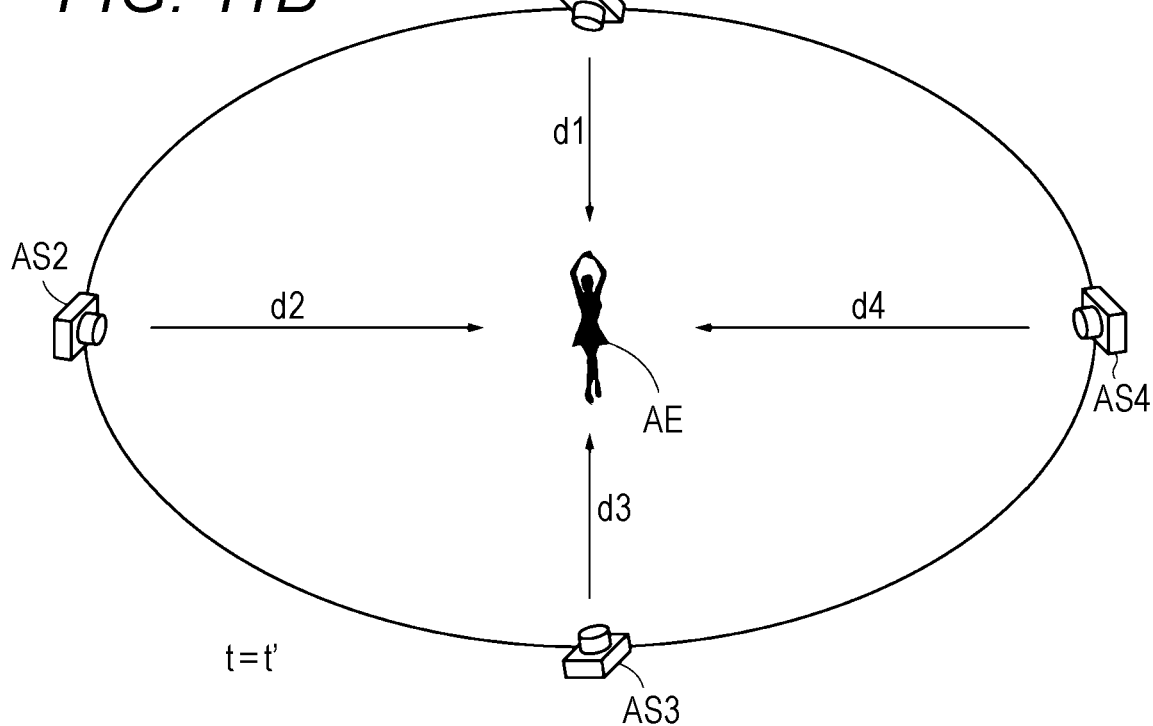

Then, as illustrated in FIG. 10B, in a case where the subject AE has moved at time point t' (t=t') later than time point 0 (t=0), the depth information d1, d2, d3, and d4 changes. By detecting this change, it is possible to determine the presence of movement of the subject AE. For example, it is determined that movement of the subject AE is present in a case where a change in at least one of the pieces of depth information d1, d2, d3, and d4 is equal to or larger than a threshold. On the other hand, as illustrated in FIGS. 11A and 11B, it is determined that movement of the subject AE is not present in a case where there is no change in the distance information acquired by the distance measuring devices AS1 to AS4 at the time points 0 and t' (including a case where the change is equal to or smaller than a threshold).

Note that the extent of change in the depth information for determining the presence of movement (that is, the threshold of the depth information for determining the presence of movement) is set appropriately according to the shape and the size of the subject.

Note that, in the present embodiment, although an example of using four distance measuring devices AS1 to AS4 is described, one distance measuring device may be used, and the presence of movement of a subject can be determined on the basis of a change in the depth information obtained by the distance measuring device. Moreover, the presence of movement of a subject may be determined on the basis of an occurrence frequency of dot-shaped data (also referred to as a point cloud) rather than the depth information. By detecting the movement or the position of a subject which is a 3-dimensional object using the distance measuring device or the point cloud information, it is possible to ascertain the movement of a subject in a simple manner.

A method of determining the movement of a subject AE in a case where the free-viewpoint image capturing system does not have a sensor such as a distance measuring device will be described. For example, as illustrated in FIG. 12, a silhouette image based on 2-dimensional image data of the time points t and t' is generated. In this case, the time points between t and t' may be appropriately thinned out to limit the 2-dimensional image data to be used for generating the silhouette image. In addition, it may be determined that the subject AE has moved in a case where there is no overlap of the subject AE in the silhouette image.

In addition, the size of a silhouette at the position of a certain image capturing device is measured using the principle of perspective projection. For example, as illustrated in FIG. 13, according to perspective projection, a close object (for example, a cylindrical object BB) is photographed in a large size and a distant object is photographed in a small size. In a case where a change in the size of a silhouette is equal to or larger than a threshold, it may be determined that the object has moved.

Besides these methods, in a case where a subject is a person, feature points of a person may be detected by performing a face detection process or the like, and the presence of movement of the subject may be determined on the basis of a movement result of the feature points. Moreover, a motion vector of a subject may be detected on the basis of a known method and the presence of movement of the subject may be determined according to the detection result. Moreover, a subject may have a marker, and the movement of the subject may be determined by detecting movement of the marker. Examples of such a marker include a retro-reflective material that is clearly visible in a wavelength region other than a visible light region, a transmitter, and the like.

In addition, the movement of a subject may be determined using the 2-dimensional image data (including a silhouette image based thereon) only obtained by a predetermined image capturing device among the plurality of image capturing devices of the free-viewpoint image capturing system.
(Process of Step ST13)

In step ST13, the 3D stroboscopic composition determining unit 14 determines whether 3D stroboscopic composition can be performed. One of the merits of stroboscopic composition videos regardless of whether the videos are 2-dimensional (2D) or 3-dimensional (3D) is that it is possible to understand the trajectory of the movement of a subject. Therefore, the 3D stroboscopic composition determining unit 14 determines that 3D stroboscopic composition can be performed in a case where it is determined in step ST12 that movement of the subject is present.

Note that 3D stroboscopic composition can be still performed even in a case where movement of a subject is not present. In this case, however, the obtained 3D stroboscopic composition video has a number of 3D models overlapping in a specific region and it is not possible to obtain a meaningful 3D stroboscopic composition video. However, even in this case, it is possible to obtain a meaningful 3D stroboscopic composition video by modifying a displaying method. Note that the details of the displaying method will be described later.
(Process of Step ST14)

In step ST14, a plurality of viewpoint images (that is, frames) to be used when generating (modeling) a 3D model is selected. For example, step ST14 is performed by the interference detecting unit 15 and the frame selecting unit 16 of the image processing device 1. Although a 3D model may be generated using all pieces of 2-dimensional image data that form the data set, in the present embodiment, frames to be used when generating the 3D model are selected by taking a processing load, visibility of a 3D stroboscopic composition video to be obtained, and the like into consideration. Specifically, pieces of 2-dimensional image data that form the data set are thinned out in a time direction. Note that six pieces of 2-dimensional image data captured in synchronization with a certain time point t are thinned out. In other words, a set of data to be used for generating a 3D model and a set of frames to be thinned out are selected using a set of six pieces of 2-dimensional image data at a certain time point t as a unit.

Figure 14A:
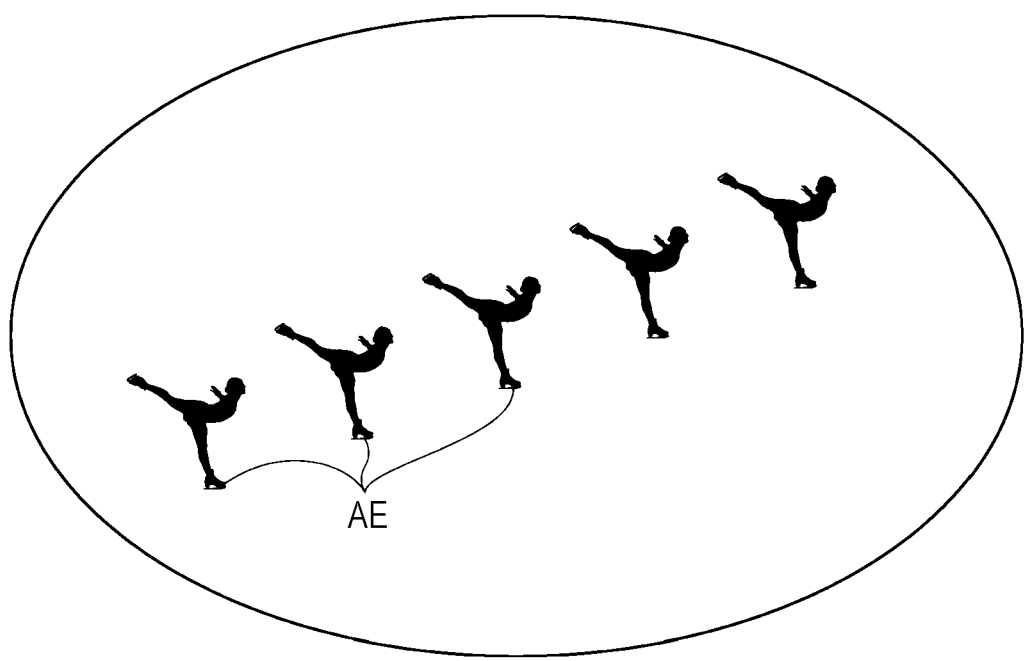
FIGS. 14A and 14B are diagrams schematically illustrating an example in which the degree of interference between subjects is equal to or smaller than a predetermined value.
Figure 14B:
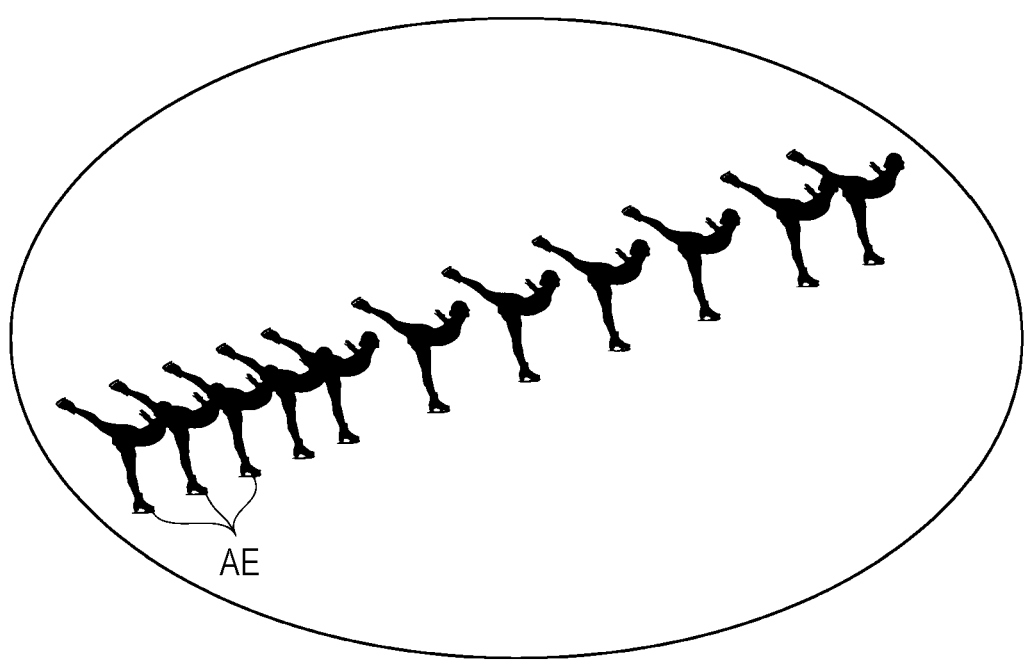

The interference detecting unit 15 detects a degree of interference indicating the degree of overlapping between subjects captured at different time points (for example, previous and posterior time points) by referring to the position of a subject in a silhouette image, for example. FIG. 14A illustrates a case where there is no overlap between subjects (degree of interference=0). FIG. 14B illustrates a case where there is an overlap between subjects. The interference detecting unit 15 outputs the detected degree of interference to the frame selecting unit 16.

The frame selecting unit 16 thins out the 2-dimensional image data of the data set appropriately by referring to the degree of interference, more specifically, so that the degree of interference output from the interference detecting unit 15 is equal to or smaller than a threshold (for example, 10%). In addition, in the present embodiment, the frame selecting unit 16 appends a flag indicating no interference between subjects (that is, the degree of interference being equal to or smaller than a threshold) to a data set after the thinning-out (that is, the data set including the 2-dimensional image data to be used for 3D modeling).

Note that, in the above-described example, although an example of detecting the degree of interference using a silhouette of a silhouette image has been described, it is preferable to determine the degree of overlapping of a subject in a 3-dimensional space using a degree of 3-dimensional interference between subjects. For example, the 3D model generating unit 17 generates a 3D model on the basis of six silhouette images at a certain time point t. The 3D models at other time points are also generated in a similar manner. By comparing the positions of 3D models in a 3-dimensional space, it is possible to detect the degree of interference between 3D models in the 3-dimensional space.

Note that when overlapping in the 3-dimensional space is determined using 3D models, the 3D models may be pseudo-3D models. A pseudo-3D model is a 3D model which is based on silhouette images corresponding to some viewpoints among all viewpoints (in the present embodiment, six image capturing devices), for example, and from which the degree of interference can be calculated. A pseudo-3D model has a shape coarser than a 3D model and can be generated faster than a 3D model, but it is possible to determine the degree of interference at a high speed. Moreover, the degree of interference may be determined at the position of a bounding box (a space in which a 3D model can be created and which corresponds to an image capturing range of an image capturing device as an example) only, and in this case, similar advantages are obtained. This provides an example in which the model generating unit 17 is configured to generate a three-dimensional model of the object from the successive images, and in which the interference detecting unit is configured to detect interference with respect to one or more bounding boxes surrounding the generated three-dimensional model.

In addition, silhouette images corresponding to respective pieces of 2-dimensional image data may be generated after the pieces of 2-dimensional image data are selected by the frame selecting unit 16.

In addition, the frame selecting unit 16 may thin out frames at equal intervals in a time direction first and then thin out frames on the basis of the degree of interference. This provides an example in which the frame selecting unit 16 is configured to select an intermediate set of images, being some but not all of the images, according to a predetermined temporal spacing of the intermediate set of images, and to select the set of images from the intermediate set of images according to the detected interference between images of the intermediate set of images.

In addition, the degree of interference may be determined on the basis of the presence of overlapping in a 3-dimensional space (that is, a logical determination of 0 or 1) and may be determined on the basis of a threshold (for example, the degree of overlapping is 10% or smaller) similarly to the above-described example. However, the method which uses a threshold is preferable since the degree of interference of a subject can be controlled. Moreover, the threshold of the degree of interference may be changed dynamically on the basis of a result based on face recognition or the like (the size, the shape of a subject, and the like) and the mode set to an image capturing device.

Figure 15:
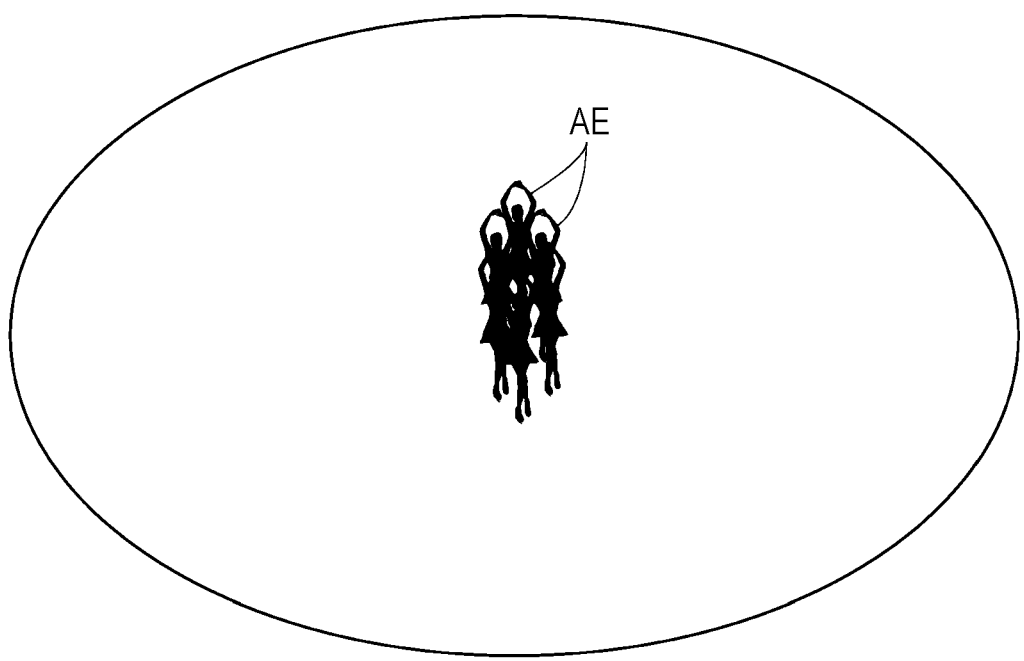
FIG. 15 is a diagram schematically illustrating an example in which the degree of interference between subjects is larger than a predetermined value.

In addition, as illustrated in FIG. 15, for example, even if it is determined that the subjects AE interfere with each other in a case where the subjects AE are seen from a lateral direction, it may be determined that the degree of interference of the subject AE is equal to or smaller than a threshold in a case where the subjects AE are seen from above. Therefore, the degree of interference between subjects may be determined on the basis of the 2-dimensional image data (or a silhouette image based thereon) obtained by an image capturing device (for example, an image capturing device provided on the ceiling capable of capturing images of a subject from an upper direction) capable of determining the degree of interference of a subject appropriately among the plurality of image capturing devices. This therefore provides an example (in which two or more cameras capture images from respective viewpoints) in which the interference detecting unit 15 is configured to detect whether, for one or more of the image capture viewpoints, the detected interference between representations of the object in the selected set of images is less than the threshold interference.

Therefore, in embodiments, the frame selecting unit can be configured to select image groups, for use by the model generating unit to generate respective 3D models for inclusion in the stroboscopic image which do not interfere with each other in a 3-dimensional space. In embodiments, the frame selecting unit is configured to detect a degree of interference, being information indicating a degree of overlapping in a 3-dimensional space between a 3D model generated on the basis of a plurality of predetermined viewpoint images and a 3D model generated on the basis of a plurality of other viewpoint images.

(Process of Step ST15)

Figure 16:
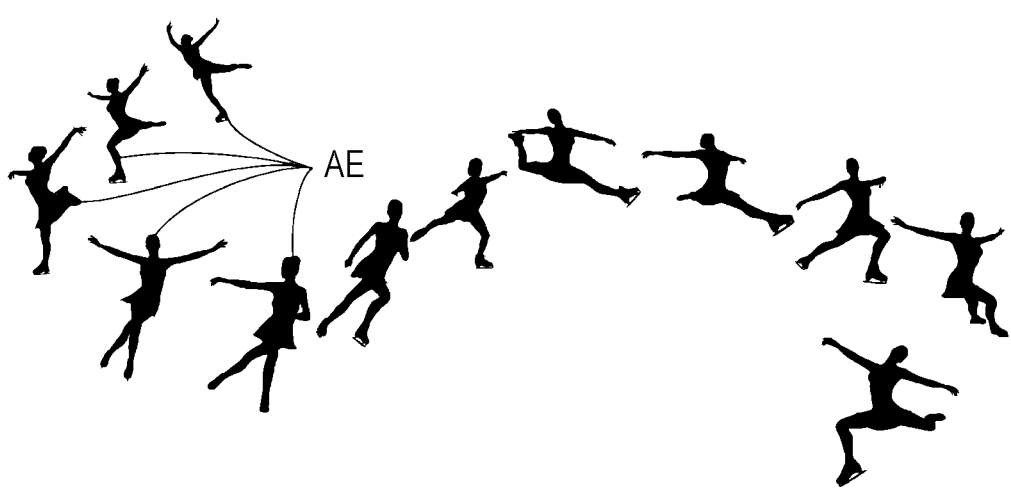
FIG. 16 is a diagram illustrating an example of a 3D stroboscopic composition video obtained by the processing of the embodiment.

In step ST15, a 3D stroboscopic composition process is performed. The 3D stroboscopic composition process is performed by the 3D model generating unit 17 and the 3D stroboscopic composition unit 18, for example. The 3D model generating unit 17 generates a 3D model using six silhouette images corresponding to six pieces of 2-dimensional image data at a certain time point t, selected by the frame selecting unit 16. Similarly, the 3D model generating unit 17 generates a 3D model using six silhouette images corresponding to six pieces of 2-dimensional image data at another time point, selected by the frame selecting unit 16. The 3D stroboscopic composition unit 18 then maps the generated respective 3D models at predetermined positions of a predetermined background to generate a 3D stroboscopic composition video as illustrated in FIG. 16. Note that, although FIG. 16 illustrates a subject AE as a 2-dimensional model due to restrictions of illustration, the subject is actually displayed as a 3D model. Moreover, although FIG. 16 illustrates an example in which the 3D models do not interfere with each other in the 3D stroboscopic composition video, some 3D models may interfere with each other. As described above, the degree of interference in a 3-dimensional space of the 3D stroboscopic composition video only needs to be equal to or smaller than a predetermined value.

Note that the 3D stroboscopic composition unit 18 may compose images of the time points between t and t to generate a 3D model at a time. For example, silhouette images corresponding to frames (2-dimensional image data) selected by the frame selecting unit 16 are composed along a time direction for respective corresponding image capturing devices (respective viewpoints). Then, the six silhouette images (hereinafter appropriately referred to as composition silhouette images) composed for respective image capturing devices are obtained. A 3D model may be generated at a time using these six composition silhouette images. In the present embodiment, since a 3D model is generated in a case where the degree of interference between subjects is equal to or smaller than a predetermined value, it is possible to generate a 3D model at a time on the basis of the composition silhouette images. Parallel processing can be performed due to this processing, and the processing can be shortened.

As described above, according to the present embodiment, it is possible to generate a 3D stroboscopic composition video automatically. Moreover, since a 3D stroboscopic composition video is generated by taking the degree of interference between subjects into consideration, it is possible to generate an appropriate 3D stroboscopic composition video without manually selecting frames to be thinned out. Moreover, viewers can watch the changes in a subject between time points t and t' from free viewpoints.

In the context of the discussion of FIGS. 3 and 4, The device 10 provides an example of image processing apparatus responsive to successive captured images of an object and to depth information indicating a three-dimensional location of the object relative to at least one distance measuring device, the image processing apparatus comprising: a frame selecting unit 16 configured to select a set of the successive images; and a composition unit 18 configured to generate a stroboscopic image, with respect to a stroboscopic image viewpoint, by superposing at least parts of the selected set of images, such that amongst the selected set of images of the object, images of the object are arranged in order of distance of the object from the stroboscopic image viewpoint, in which, for a pair of images of the object at different timepoints in which an earlier image of the object has a smaller distance from the stroboscopic image viewpoint than a later image of the object, the earlier image of the object closer to the stroboscopic image viewpoint is displayed nearer the foreground than the later image of the object.

[Transmission System]

Next, a transmission system according to the present embodiment will be described. The present applicant has already proposed a technology disclosed in WO 2017/082076A as a method for transmitting 3D data efficiently. The matters disclosed in the proposal can be applied to the present disclosure.

(Overview of Transmission System)

Figure 17:
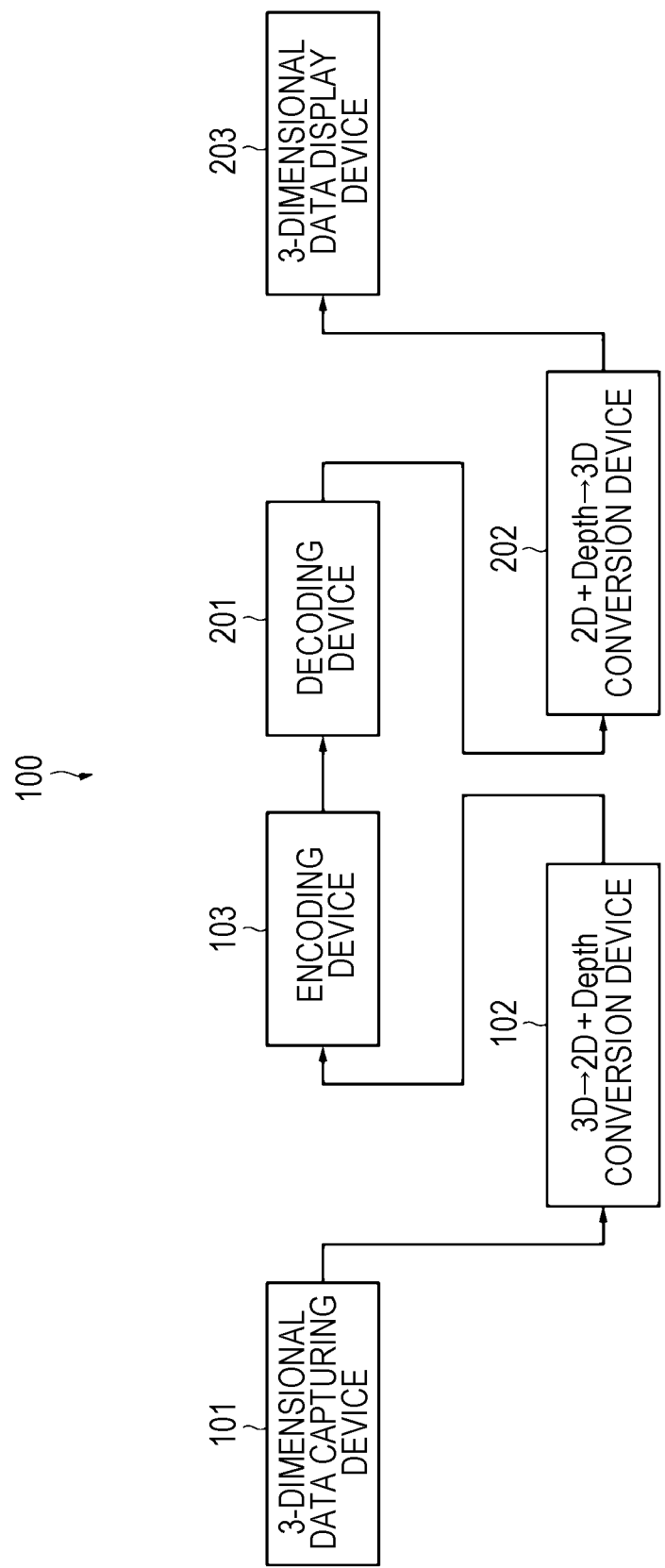
FIG. 17 is a block diagram illustrating a configuration example of a transmission system according to an embodiment.

With the previously proposed technology in mind, a transmission system according to the present embodiment will be described. FIG. 17 illustrates a transmission system according to an embodiment (hereinafter appropriately referred to as a transmission system 100). The transmission system 100 includes a 3-dimensional data capturing device 101, a conversion device 102, and an encoding device 103 as a transmission-side device. Moreover, the transmission system 100 includes a decoding device 201, a conversion device 202, and a 3-dimensional data display device 203 as a reception-side device.

The free-viewpoint image capturing system can be used as the 3-dimensional data capturing device 101. That is, the 2-dimensional image data and the depth image data captured by the respective image capturing devices are obtained by the 3-dimensional data capturing device 101.

In addition, the image processing device 1 included in each image capturing device performs modeling based on visual hulls or the like using the 2-dimensional image data and the depth image data of the viewpoints of the respective image capturing devices and the internal parameters and the external parameters of the respective image capturing devices to create a mesh. The image processing device 1 generates geometric information (geometry) indicating 3-dimensional positions of respective points (vertices) that form the created mesh and connections (polygons) of the respective points and 2-dimensional image data of the mesh as 3-dimensional data of the subject.

Note that the details of a method for generating 3-dimensional data from 2-dimensional image data and depth image data of a plurality of viewpoints are disclosed, for example, in Saied Moezzi, U-Cheng Tai, Philippe Gerard, "Virtual View Generation for 3D Digital Video", University of California, San Diego, and Takeo Kanade and Peter Rander, P. J. Narayanan, "Virtualized Reality: Constructing Virtual Worlds from Real Scenes".

The conversion device 102 sets internal parameters and external parameters of a virtual camera of a plurality of viewpoints corresponding to a predetermined display image generation method as camera parameters. Then, the conversion device 102 converts the 3-dimensional data supplied from the respective image capturing devices to 2-dimensional image data and depth image data on the basis of the camera parameters and generates 2-dimensional image data and depth image data of a plurality of viewpoints corresponding to the predetermined display image generation method. The conversion device 102 supplies the generated 2-dimensional image data and depth image data to the encoding device 103.

Note that the details of a 3D CG technology of generating 2-dimensional image data and depth image data of a plurality of viewpoints from 3-dimensional data are disclosed, for example, in Masayuki Tanimoto, "Realizing the Ultimate Visual Communication", IEICE technical report, CS, Communication Scheme, 110(323), 73-78, 2010-11-25 and the like.

In the present specification, although it is assumed that the viewpoint of the 2-dimensional image data is the same as the viewpoint of the depth image data, the viewpoints and the number of viewpoints of the 2-dimensional image data and the depth image data may be different. Moreover, the viewpoints and the number of viewpoints of the 2-dimensional image data and the depth image data may be same with or different from those of the cameras of the image capturing devices.

The encoding device 103 extracts 3-dimensional data of an occlusion region invisible from a plurality of viewpoints corresponding to the predetermined display image generation method from the 3-dimensional data supplied from the respective image capturing devices (hereinafter referred to as occlusion 3-dimensional data). Then, an encoding unit (not illustrated) included in the encoding device 103 performs an encoding process based on a predetermined encoding method with respect to metadata including the 2-dimensional image data and the depth image data of a plurality of viewpoints corresponding to the predetermined display image generation method, the occlusion 3-dimensional data, and camera related information which is information regarding a virtual camera such as a camera parameter of each viewpoint. Examples of the encoding method include a multiview and depth video coding (MVCD) method, an AVC method, an HEVC method and the like.

In a case where the encoding method is an MVCD method, 2-dimensional image data and depth image data of all viewpoints are collectively encoded. As a result, one encoded stream including the metadata and encoded data of the 2-dimensional image data and the depth image data is generated. In this case, the camera parameters within the metadata are disposed in reference displays information SEI of the encoded stream. Moreover, information regarding the depth image data within the metadata is disposed in depth representation information SEI.

On the other hand, in a case where the encoding method is an AVC method or an HEVC method, the depth image data and the 2-dimensional image data of the respective viewpoints are encoded separately. As a result, an encoded stream of the respective viewpoints including the 2-dimensional image data and the metadata of the respective viewpoints and an encoded stream of the respective viewpoints including the metadata and the encoded data of the depth image data of the respective viewpoints are generated. In this case, the metadata is disposed in user unregistered SEI of each encoded stream, for example. Moreover, information that correlates an encoded stream and camera parameters and the like is included in the metadata.

Note that the information that correlates the encoded stream and the camera parameters and the like may not be included in the metadata, but only metadata corresponding to the encoded stream may be included in the encoded stream.

The encoding device 103 transmits the encoded streams to the decoding device 201. Note that, in the present specification, although the metadata is transmitted in a state of being disposed in the encoded stream, the metadata may be transmitted separately from the encoded stream.

A decoding unit (not illustrated) included in the decoding device 201 receives the encoded streams transmitted from the encoding device 103 and decodes the encoded streams according to a method corresponding to the encoding method. The decoding unit the 2-dimensional image data and the depth image data of the plurality of viewpoints and the metadata obtained as the decoding results to the conversion device 202.

The conversion device 202 generates a 3D model from the 2-dimensional image data and the depth image data of the plurality of viewpoints to generate display image data in which the 3D model is mapped on a predetermined background. Then, the conversion device 202 supplies the display image data to the 3-dimensional data display device 203.

The 3-dimensional data display device 203 is configured as a 2-dimensional head-mounted display, a 2-dimensional monitor, a 3-dimensional head-mounted display, a 3-dimensional monitor, or the like. The 3-dimensional data display device 203 displays a 3D stroboscopic composition video on the basis of the supplied display image data. Note that the individual 3D model may be represented (for example, displayed) as independent models rather than the 3D stroboscopic composition video.

(Generation of 3D Model in Transmission System)

Figure 18:
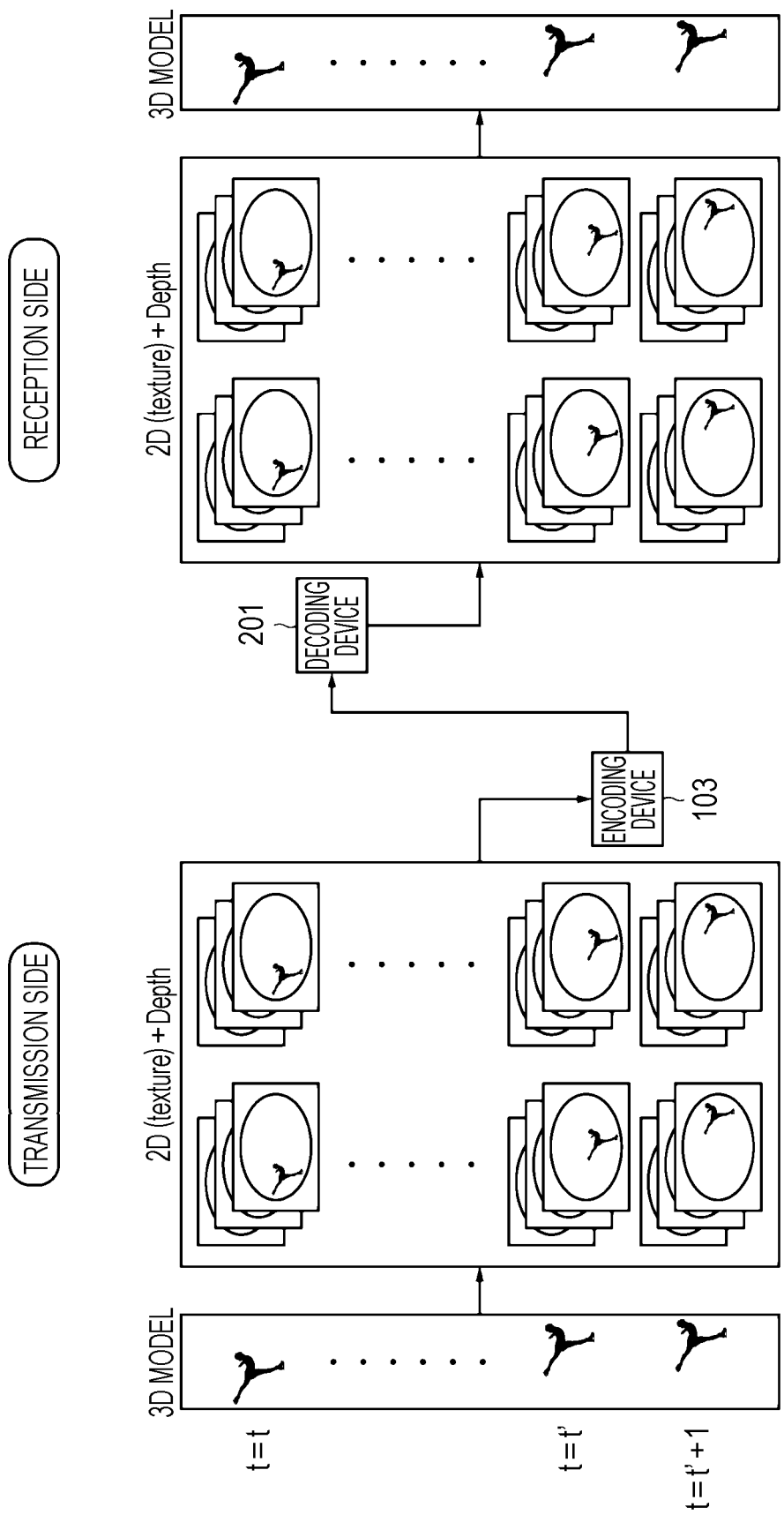
FIG. 18 is a diagram for describing an example of the processing performed by the transmission system according to an embodiment.

FIG. 18 illustrates the transmission system 100 in a more simplified manner. On the transmission side, a 3D model is generated and the 3D model is converted to 2-dimensional image data (including color information of RGB or the like) and depth image data. The 2-dimensional image data, the depth image data, and the like are encoded by the encoding device 103 and are transmitted.

When a 3D model is generated on the transmission side, the above-described 3D model generation method can be used. In a case where it is determined on the transmission side that a transmission segment is represented by a 3D stroboscopic composition video, it is possible to reduce the number of frames. That is, as described above, in the present embodiment, since the frames to be used for generating a 3D model are selected by the frame selecting unit 16 when generating the 3D model, it is possible to reduce the number of pieces of transmission data. For example, even in a case where 120 frames are obtained in the free-viewpoint image capturing system, since the frames are thinned out for 3D stroboscopic composition, the number of frames to be transmitted is small (for example, 12 frames). Note that, in the illustrated example, although the 2-dimensional image data, the depth image data, and the metadata are encoded and transmitted, the 3D model itself (that is, the 3-dimensional data from which a 3D model can be reproduced on the reception side) may be encoded according to a predetermined encoding method and be transmitted. On the reception side, in a case where a 3D model is transmitted, texture mapping may be performed on the basis of the corresponding 2-dimensional image data.

Note that, on the reception side, it is possible to generate 2-dimensional image data of free viewpoints by generating 3-dimensional data on the basis of the 2-dimensional image data and the depth image data transmitted from the transmission side and performing perspective projection of a 3-dimensional object corresponding to the 3-dimensional data with respect to free viewpoints. Therefore, even in a case where a 3D model is transmitted from the transmission side, it is possible to generate 2-dimensional image data corresponding to the 3D model on the reception side.

Figure 19:
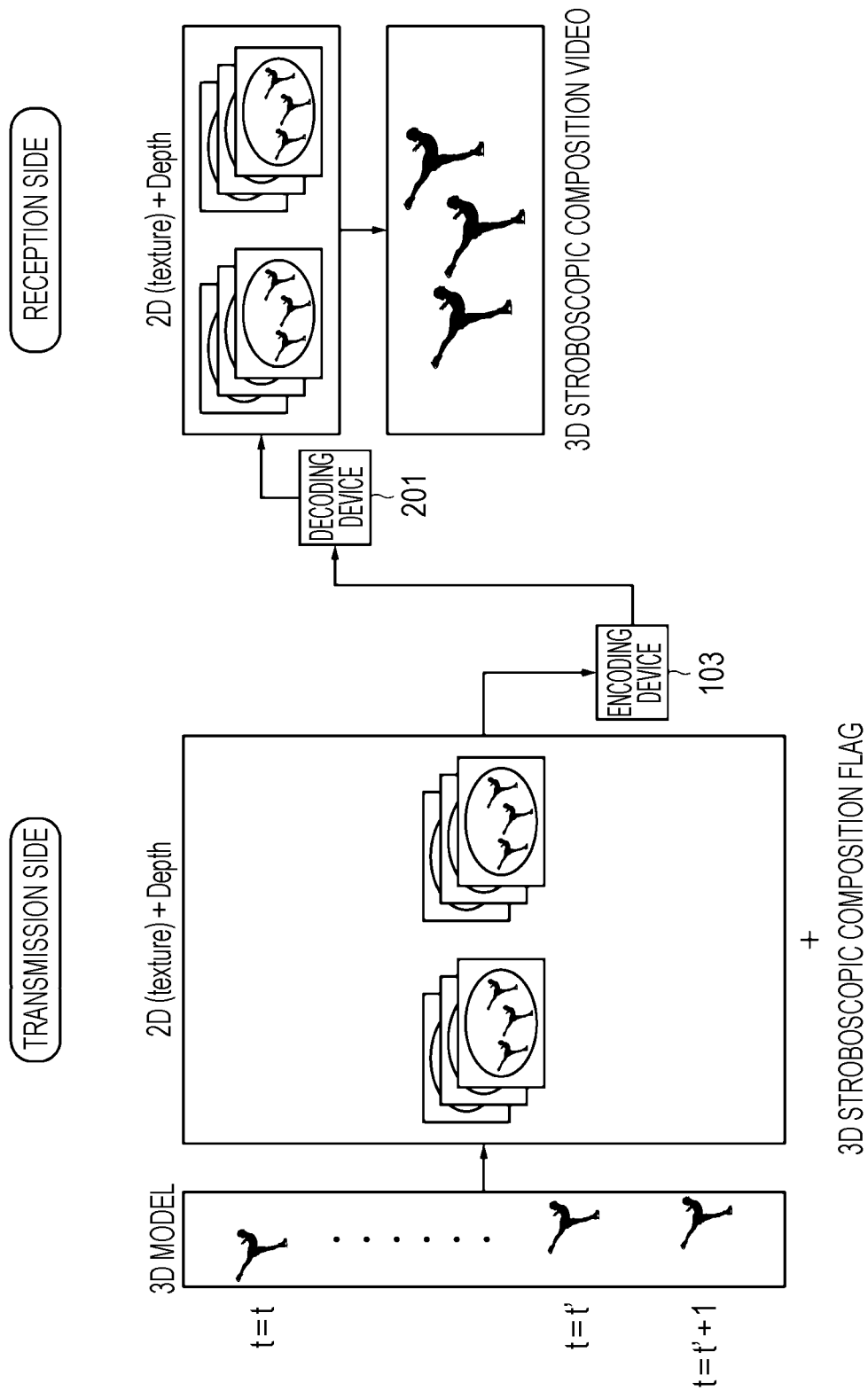
FIG. 19 is a diagram for describing another example of the processing performed by the transmission system according to an embodiment.

Note that, as illustrated in FIG. 19, a 3D stroboscopic composition flag may be included in transmission data (encoded data). The reception side may perform a process of generating a 3D stroboscopic composition video only in a case where a 3D stroboscopic composition flag is included in the data transmitted from the transmission side, or in a case where the flag is "1" (or "0").

In addition, in a case where a 3D stroboscopic composition flag is not present, it may be determined whether the reception side can generate a 3D stroboscopic composition video. For example, as illustrated in FIG. 20, 2-dimensional image data only is transmitted from the transmission side. The reception side obtains depth information of a subject in the 2-dimensional image data using known image processing. In addition, the reception side performs a process of generating the 3D model and determines whether a 3D stroboscopic composition video can be generated. The 3D stroboscopic composition video may be generated in a case where the 3D stroboscopic composition video can be generated.

(Method of Separating Object)

Note that, as illustrated in FIG. 21, as described above, a flag indicating that subjects do not interfere with each other in a 3-dimensional space may be appended in a case where the degree of interference between subjects is equal to or smaller than a predetermined value. By transmitting such a flag, it is possible to separate an object on the reception side. This separation will be described in more detail.

Figure 22A:
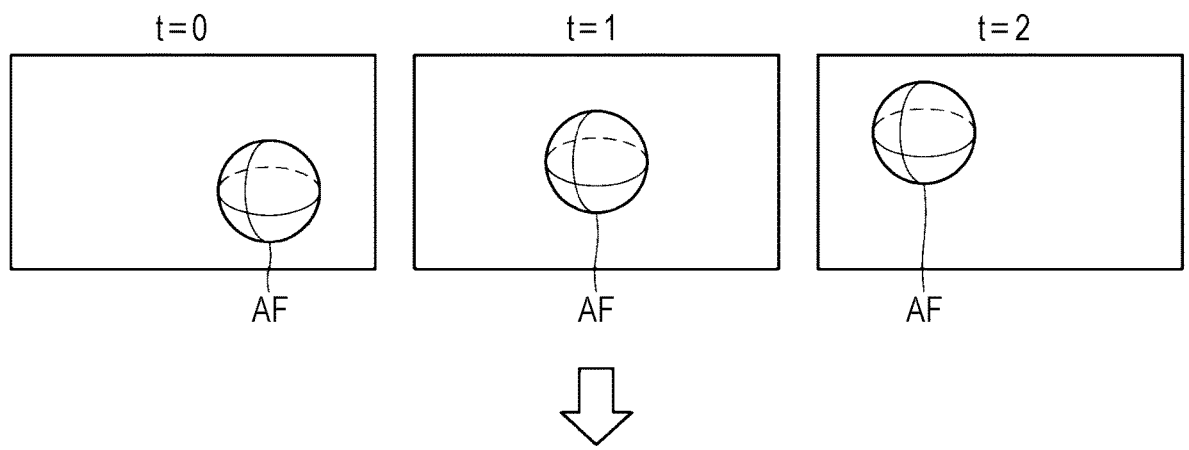
FIGS. 22A and 22B are diagrams illustrating an example of an ordinary silhouette image.
Figure 22B:
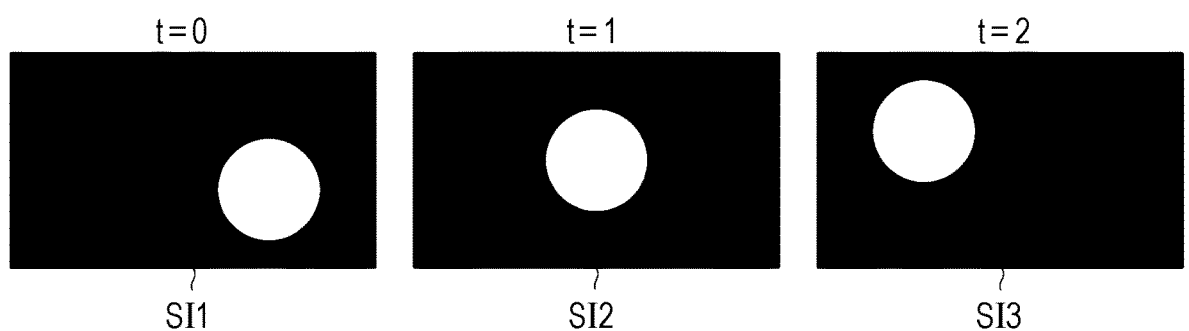

FIG. 22A illustrates how a spherical subject AF moves between time points t0 and t2. FIG. 22B illustrates silhouette images corresponding to the subject AF at the respective time points. Generally, silhouette images SI1 to SI3 corresponding to the positions of the subject AF at the respective time points are generated.

Figure 23A:
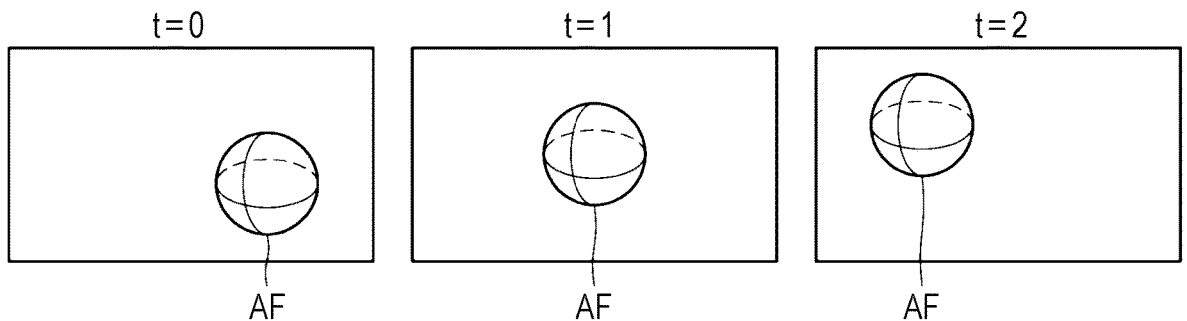
FIGS. 23A and 23B are diagrams illustrating an example of a silhouette image according to an embodiment.
Figure 23B:
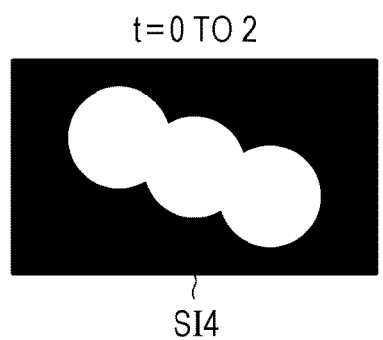

FIG. 23A illustrates how a spherical subject AF moves between time points t0 and t2 similarly to FIG. 22A. In the present embodiment, as illustrated in FIG. 23B, for example, it is possible to generate a composition silhouette image SI4 in which the silhouette images SI1 to SI3 are composed.

Figure 24:
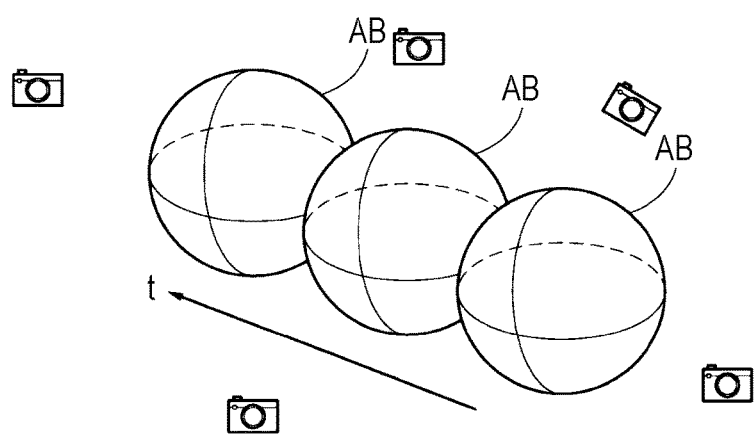
FIG. 24 is a diagram schematically illustrating an example of a free-viewpoint image capturing system.
Figure 25:
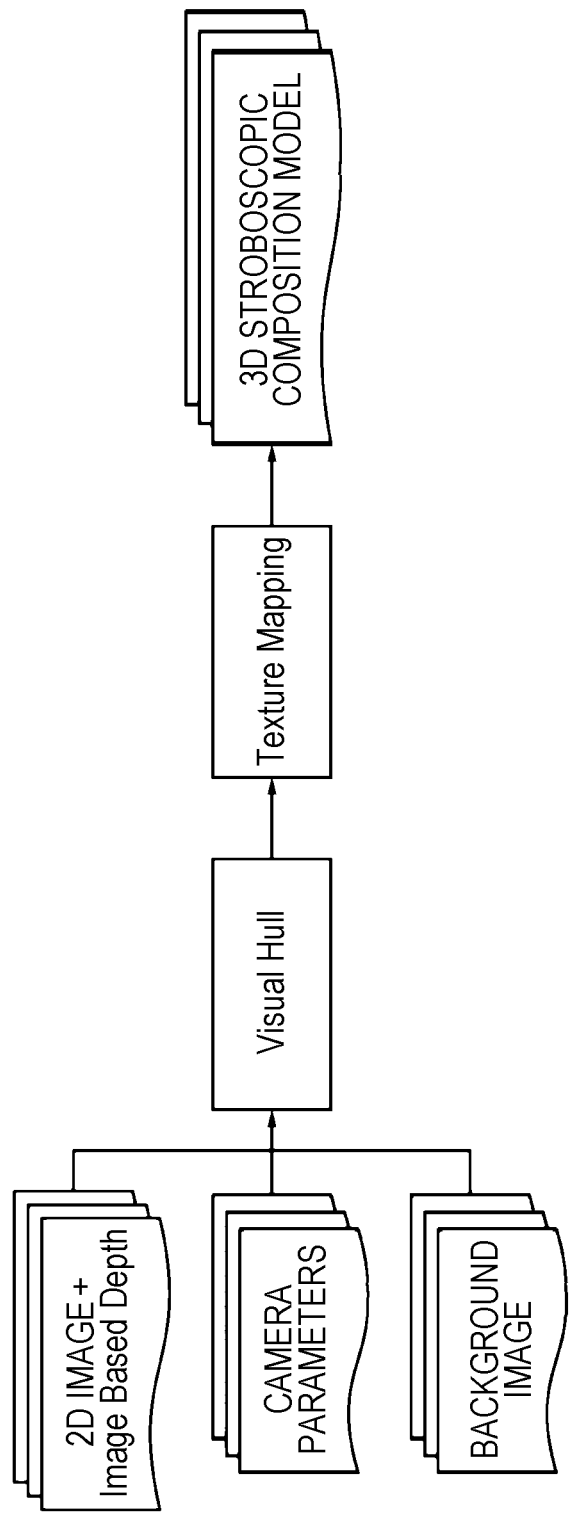
FIG. 25 is a diagram referred to when describing the processing performed on a reception side of the transmission system.

Here, as illustrated in FIG. 24, a free-viewpoint image capturing system that captures the subject AF moving with the lapse of time t using five image capturing devices surrounding the subject AF will be considered. When the 2-dimensional image data and the like obtained by the free-viewpoint image capturing system are transmitted, a background image is also transmitted together with a flag indicating the subjects do not interfere with each other in a 3-dimensional space as illustrated in FIG. 25. Note that the camera parameters include the positions of the respective image capturing devices in the 3-dimensional position. Moreover, the 2-dimensional image data and the depth image data in FIG. 25 may be a 3D model including color information.

On the reception side, it is possible to generate a silhouette image corresponding to the 3D stroboscopic composition video by referring to the background image and the camera parameters. An example of the silhouette image is illustrated as silhouette images SI5 to SI9 in FIG. 26A. Furthermore, on the reception side, it is also possible to separate a silhouette corresponding to the subject AF at a certain time point from the silhouette image SI5, for example, by referring to the background image.

Separation of silhouettes can be realized by reprojecting the 3D model on a camera viewpoint. An example of a method of separating silhouettes will be described. A visual hull method (a visual volume intersection method) generates a 3D object (a mesh) using silhouette images captured by a plurality of cameras. For example, a visual hull is generated using the composition silhouette image SI5 obtained by the free-viewpoint image capturing system which uses five image capturing devices illustrated in FIG. 24. In this state, three objects are stuck together (three cylinders are stuck horizontally). Subsequently, the visual hull is cut using the composition silhouette image SI6. In this way, the 3D object is separated into three objects. The silhouette images up to the composition silhouette image SI9 are projected to a cube of the visual hull in this order whereby three spheres are obtained. If it is possible to generate a visual hull from image data (light ray information of an object), it is possible to reproject the depth of a 3D object to a camera if the camera parameters are known. That is, when the depth information of each object is reprojected to a camera, it is possible to identify a shape photographed by the camera. Furthermore, when the depth is converted to logical 2-value information of 0 and 1, separated silhouettes are obtained. In this way, silhouettes can be separated.

In addition, it is also possible to generate an independent 3D model on the basis of a silhouette image including separated silhouettes at a certain time point. Furthermore, in a case where it is possible to detect a motion vector of the subject AF, it is possible to interpolate the position of the subject AF at a certain time point. In this way, it is possible to generate a silhouette image including silhouettes at the interpolated position of the subject AF and to generate a 3D model based on the silhouette image.

In this manner, when the transmission system 100 appends a flag indicating that subjects do not interfere with each other, the transmission side only needs to transmit one composition silhouette image of certain time points t to t', for example, and it is possible to reduce the amount of transmission data. The reception side can generate a silhouette image in which the subjects of respective time points are separated on the basis of one composition silhouette image. Moreover, it is possible to generate a 3D model on the basis of the generated silhouette image. The reception side may display the generated 3D models as independent models and may display a 3D stroboscopic composition video generated by superimposing the generated 3D models at the respective time points on a predetermined background.

DISPLAY EXAMPLE

Next, a display example of the respective 3D models of a 3D stroboscopic composition video will be described. Note that display-related control to be described later is performed by the 3D stroboscopic composition unit 18, for example. In the present embodiment, although the 3D stroboscopic composition unit 18 is described as an example of a display control unit, the image processing device 1 may have a display control unit different from the 3D stroboscopic composition unit 18.

In some examples, the display control unit that displays the stroboscopic image on a display device, wherein the display control unit is configured to display the stroboscopic image generated by arranging display positions of the 3D models at different positions from original positions in a case where an amount of change in the position of the subject is equal to or smaller than a predetermined value.

First Display Example

Figure 27:
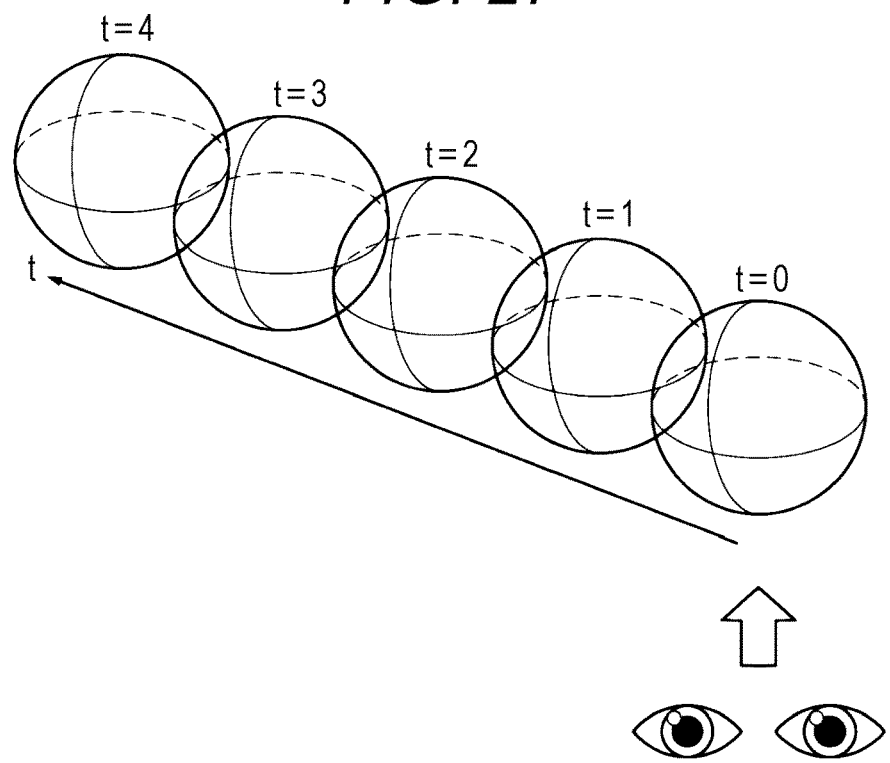
FIG. 27 is a diagram for describing problems to be taken into consideration when displaying a 3D model using an ordinary method.
Figure 28:
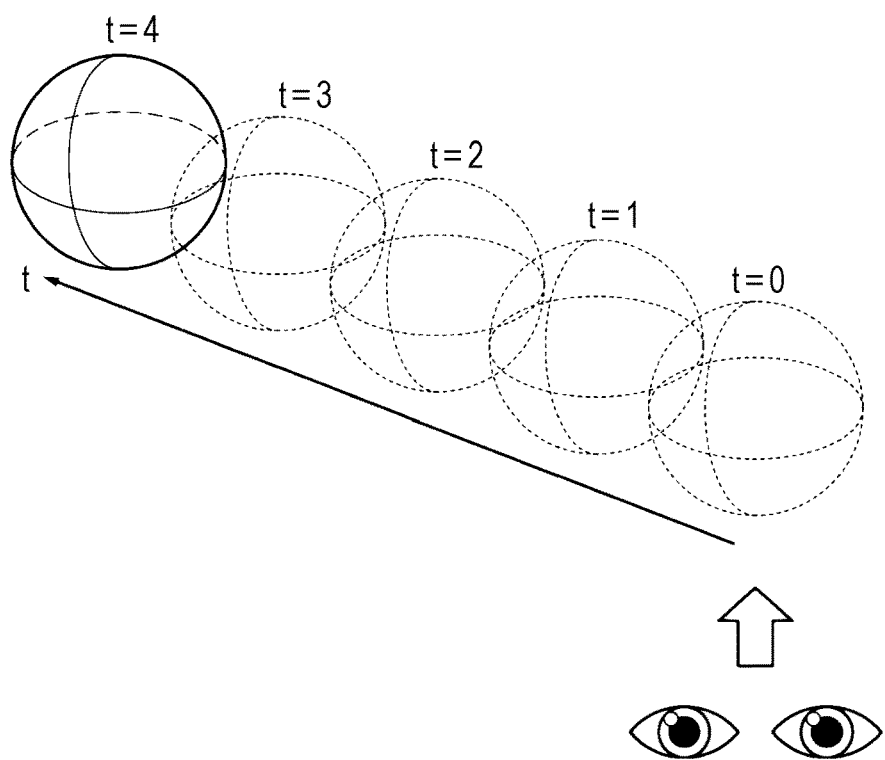
FIG. 28 is a diagram referred to when describing an example of a method of displaying a 3D stroboscopic composition video according to an embodiment.

In a first display example, in a case where a subject moves away from a viewer, a newest subject (object) (that is, the subject positioned on the deeper side) is displayed to be more clearly visible than other subjects. For example, in a 3D stroboscopic composition video illustrated in FIG. 27, the newest subject (the subject of time point t4 in the illustrated example) is not visible or is not easily visible. Therefore, as illustrated in FIG. 28, the newest subject is displayed to be clearly visible. For example, subjects captured in earlier time points (in the illustrated example, the subjects of time points t0 to t3) are displayed as wire frames, semi-transparently, or as coarse point clouds. Moreover, the density of a subject may increase gradually so that the density of the newest subject (the subject of time point t4) is higher than that of the earlier subject (the subject of time point t0). By this display, the viewer can watch the 3D model on the deeper side clearly.

Second Display Example

Figure 29A:
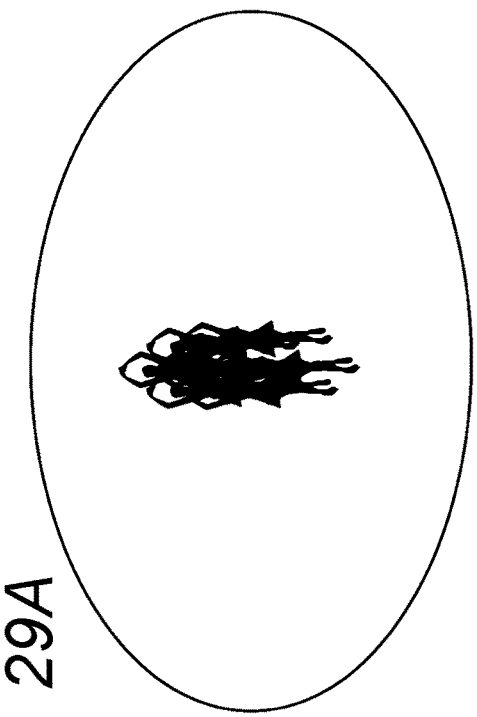
FIGS. 29A to 29C are diagrams referred to when describing another example of a method of displaying a 3D stroboscopic composition video according to an embodiment.

In a second display example, the generated 3D models are displayed at positions different from their original positions. As described above, the 3D stroboscopic composition video may be generated even in a case where movement of a subject is not present or in a case where a movement amount of a subject is equal to or smaller than a predetermined value. In such a case, when the generated 3D models are simply disposed at their original positions, the 3D models may concentrate on a specific region as schematically illustrated in FIG. 29A.

Figure 29B:
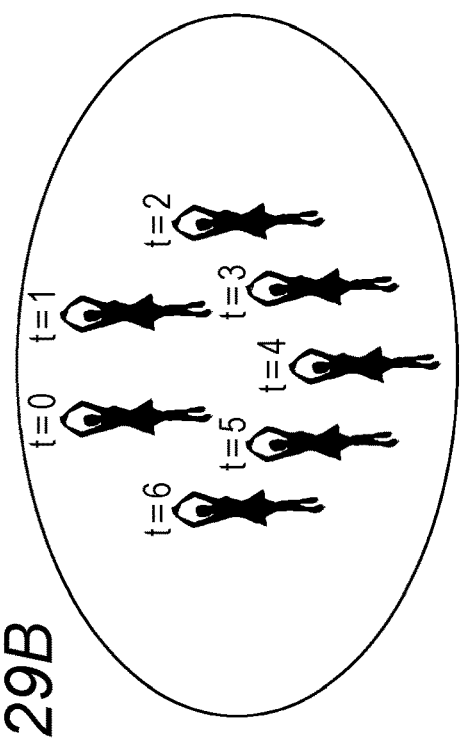

Therefore, 3D models are generated at respective time points, and the 3D models are rearranged so that the display positions of the 3D models are different from their original positions (that is, the degree of interference between 3D models is equal to or smaller than a predetermined value) to thereby generate a 3D stroboscopic composition video. For example, as illustrated in FIG. 29B, a 3D stroboscopic composition video in which the generated 3D models are arranged in a circular direction so as to be located at positions different from their original positions is generated. (This is an example in which the composition unit is configured to generate the stroboscopic image using display positions for the representations of the object for those images along a predetermined display path such as the circular path).

Figure 29C:
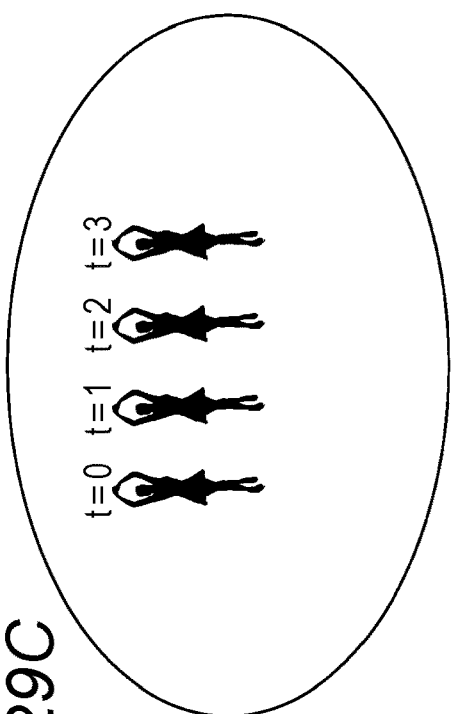

Moreover, as illustrated in FIG. 29C, a 3D stroboscopic composition video in which the generated 3D models are arranged in a lateral direction so as to be located at positions different from their original positions may be generated. Note that, in a case where the arrangement of a plurality of 3D models is adjusted in this manner, the positions of some 3D models may be identical to their original positions.

These arrangements therefore provide an example of image processing apparatus 1 responsive to successive images providing representations of an object and to depth information indicating a three-dimensional location of the object relative to at least one distance measuring device, the image processing apparatus comprising:

a frame selecting unit configured to select a set of the successive images; and a composition unit configured to generate a stroboscopic image, with respect to a stroboscopic image viewpoint, from the selected set of images; in which, when the three-dimensional locations of the object are closer than a threshold separation for at least a pair of the selected images, the composition unit is configured to generate the stroboscopic image using display positions for at least some of the representations of the object for those images different from the display positions of the respective captured images.

Such an image processing device may perform an image processing method comprising: receiving successive images providing representations of an object and depth information indicating a three-dimensional location of the object relative to at least one distance measuring device; selecting a set of the successive images; and generating a stroboscopic image, with respect to a stroboscopic image viewpoint, from the selected set of images; in which, when the three-dimensional locations of the object are closer than a threshold separation for at least a pair of the selected images, the generating step comprises generating the stroboscopic image using display positions for at least some of the representations of the object for those images different from the display positions of the respective captured images.

Note that, in a case where a plurality of different subjects (for example, football or basketball players) are present, 3D stroboscopic composition videos of respective subjects can be generated by tracking a specific subject or setting a flag for identifying each subject or the like.

<Modification>

While embodiments of the present disclosure have been described in detail, the content of the present disclosure is not limited to the embodiments, and various changes and modifications may be effected based on the technical spirit of the present disclosure.

The present disclosure can be realized by a device, a method, a program, a system, and the like. For example, a program for executing the functions described in the embodiments may be downloadable, and a device that does not have the functions described in the embodiments may download and install the program. By doing so, the device can perform control described in the embodiments. The present disclosure can be realized by a server that distributes such a program. In addition, the matters described in the embodiments and the modification can be combined with each other appropriately.

The present disclosure may employ constituent elements defined by the following numbered clauses:

[Clause 1]
An image processing device comprising:
an acquisition unit that acquires a plurality of viewpoint images obtained by capturing a subject at a first time point, a plurality of viewpoint images obtained by capturing the subject at a second time point, and a plurality of viewpoint images obtained by capturing the subject at a third time point; and
an image generating unit that generates a composition 3D model including 3D models of the subject at respective time points generated on the basis of the plurality of viewpoint images of the respective time points of at least two time points of the first to third time points on the basis of subject positions of the respective time points.

[Clause 2]
The image processing device according to clause 1, further comprising:
a determining unit that determines presence of movement of the subject according to a change in the position of the subject, wherein
the image generating unit generates the composition 3D model in a case where the determining unit determines that movement of the subject is present.

[Clause 3]
The image processing device according to clause 1, further comprising:
a selecting unit that selects the plurality of viewpoint images to be used when generating the 3D models.

[Clause 4]
The image processing device according to clause 3, wherein
the plurality of viewpoint images to be used when generating the 3D models are images selected by the selecting unit by referring to a degree of interference between subjects of at least different time points.

[Clause 5]
The image processing device according to clause 4, wherein
the degree of interference is information indicating a degree of overlapping in a 3-dimensional space between a 3D model generated on the basis of a plurality of predetermined viewpoint images and a 3D model generated on the basis of a plurality of other viewpoint images.

[Clause 6]
The image processing device according to clause 4, wherein
the degree of interference is information indicating a degree of overlapping in a 3-dimensional space between a pseudo-3D model generated on the basis of some viewpoint images among a plurality of predetermined viewpoint images and a pseudo-3D model generated on the basis of some viewpoint images among a plurality of other viewpoint images.

[Clause 7]
The image processing device according to clause 1, wherein
a degree of interference in a 3-dimensional space between respective 3D models included in the composition 3D model is equal to or smaller than a predetermined value.

[Clause 8]
The image processing device according to clause 7, wherein
the respective 3D models included in the composition 3D model do not interfere with each other in a 3-dimensional space.

[Clause 9]
The image processing device according to clause 1, wherein
the 3D model is generated on the basis of a plurality of viewpoint images obtained at corresponding time points on a real-time basis.

[Clause 10]
The image processing device according to clause 1, wherein
the 3D model is generated on the basis of composition images obtained by composing a plurality of viewpoint images of respective time points at respective viewpoints.

[Clause 11]
The image processing device according to clause 1, wherein
the 3D model is generated on the basis of a silhouette image obtained by separating the subject and a background from the viewpoint image.

[Clause 12]
The image processing device according to clause 1, further comprising:
a display control unit that displays the composition 3D model on a display device.

[Clause 13]
The image processing device according to clause 12, wherein
the display control unit displays a 3D model later in time among a plurality of 3D models included in the composition 3D model so as to be more clearly visible than other 3D models.

[Clause 14]
The image processing device according to clause 12, wherein
the display control unit displays the composition 3D model generated by arranging display positions of the 3D models at different positions from original positions in a case where an amount of change in the position of the subject is equal to or smaller than a predetermined value.

[Clause 15]
An encoding device comprising:
an encoding unit that generates encoded data by encoding a 3D model of a subject of each time point generated on the basis of a plurality of viewpoint images of respective time points of at least two time points of first, second, and third time points, at least one of 2D image data converted from the 3D model and depth image data indicating a depth of a subject included in the 2D image data, and a flag indicating that the 3D models of the respective time points do not interfere with each other, according to a predetermined encoding method, on the basis of the subject positions at the respective time points of the first to third time points.

[Clause 16]
A decoding device comprising:
a decoding unit that decodes encoded data including a 3D model of a subject of each time point generated on the basis of a plurality of viewpoint images of respective time points of at least two time points of first, second, and third time points, at least one of 2D image data converted from the 3D model and depth image data indicating a depth of a subject included in the 2D image data, camera parameters of an image capturing device that acquires the viewpoint images, and a background image of the viewpoint image, on the basis of the subject positions at the respective positions of the first to third time points, wherein
the decoding unit generates a composition 3D model including the 3D models on the basis of the background image and the camera parameters and separates the subject of a predetermined time point from an image based on the composition 3D model.

[Clause 17]
An image processing method comprising:
causing an acquisition unit to acquire a plurality of viewpoint images obtained by capturing a subject at a first time point, a plurality of viewpoint images obtained by capturing the subject at a second time point, and a plurality of viewpoint images obtained by capturing the subject at a third time point; and
causing an image generating unit to generate a composition 3D model including 3D models of the subject at respective time points generated on the basis of the plurality of viewpoint images of the respective time points of at least two time points of the first to third time points on the basis of subject positions of the respective time points.

[Clause 18]
A program for causing a computer to execute an image processing method comprising:
causing an acquisition unit to acquire a plurality of viewpoint images obtained by capturing a subject at a first time point, a plurality of viewpoint images obtained by capturing the subject at a second time point, and a plurality of viewpoint images obtained by capturing the subject at a third time point; and
causing an image generating unit to generate a composition 3D model including 3D models of the subject at respective time points generated on the basis of the plurality of viewpoint images of the respective time points of at least two time points of the first to third time points on the basis of subject positions of the respective time points.

[Clause 19]
An encoding method comprising:
causing an encoding unit to generate encoded data by encoding a 3D model of a subject of each time point generated on the basis of a plurality of viewpoint images of respective time points of at least two time points of first, second, and third time points, at least one of 2D image data converted from the 3D model and depth image data indicating a depth of a subject included in the 2D image data, and a flag indicating that the 3D models of the respective time points do not interfere with each other, according to a predetermined encoding method, on the basis of the subject positions at the respective time points of the first to third time points.

[Clause 20]
A decoding method comprising:
causing a decoding unit to decode encoded data including a 3D model of a subject of each time point generated on the basis of a plurality of viewpoint images of respective time points of at least two time points of first, second, and third time points, at least one of 2D image data converted from the 3D model and depth image data indicating a depth of a subject included in the 2D image data, camera parameters of an image capturing device that acquires the viewpoint images, and a background image of the viewpoint image, on the basis of the subject positions at the respective positions of the first to third time points; and
causing the decoding unit to generate a composition 3D model including the 3D models on the basis of the background image and the camera parameters and separate the subject of a predetermined time point from an image based on the composition 3D model.

The present disclosure may employ constituent elements defined by the following further set of numbered clauses:

1. Image processing apparatus responsive to successive images containing representations of an object, the image processing apparatus comprising:
an interference detecting unit to detect interference, representing an overlap between the representations of the object in the successive images;
a frame selecting unit configured to select a set of the successive images such that the detected interference between representations of the object in the selected set of images is less than a threshold interference; and
a composition unit configured to generate a stroboscopic image from the selected set of images.

2. Apparatus according to clause 1, in which the threshold interference represents zero interference.

3. Apparatus according to clause 1, in which the threshold interference represents an overlap of a predetermined proportion of the image area of the representations of the object.

4. Apparatus according to clause 1, in which the predetermined proportion is 10%.

5. Apparatus according to any one of the preceding clauses, in which the frame selecting unit is configured to select an intermediate set of images, being some but not all of the images, according to a predetermined temporal spacing of the intermediate set of images, and to select the set of images from the intermediate set of images according to the detected interference between images of the intermediate set of images.

6 Apparatus according to any one of the preceding clauses, comprising a model generator to generate a three-dimensional model of the object from the successive images, and in which the interference detecting unit is configured to detect interference with respect to one or more bounding boxes surrounding the generated three-dimensional model.

7. Apparatus according to any one of the preceding clauses, comprising a set of devices providing:

two or more image capturing devices, arranged so that the successive images comprise groups of images captured from different respective image capture viewpoints; and one or more distance measuring devices.

8. Apparatus according to clause 7, in which the interference detecting unit is configured to detect whether, for one or more of the image capture viewpoints, the detected interference between representations of the object in the selected set of images is less than the threshold interference.

9. An image processing method comprising:

receiving successive images containing representations of an object;

detecting interference, representing an overlap between the representations of the object in the successive images;

selecting a set of the successive images such that the detected interference between representations of the object in the selected set of images is less than a threshold interference; and generating a stroboscopic image from the selected set of images.

10. Computer software which, when executed by a computer, causes the computer to perform the method of clause 10.

11. A non-transitory machine-readable medium which stores computer software according to clause 10.

12. Image processing apparatus responsive to successive captured images of an object and to depth information indicating a three-dimensional location of the object relative to at least one distance measuring device, the image processing apparatus comprising:

a frame selecting unit configured to select a set of the successive images; and a composition unit configured to generate a stroboscopic image, with respect to a stroboscopic image viewpoint, by superposing at least parts of the selected set of images, such that amongst the selected set of images of the object, images of the object are arranged in order of distance of the object from the stroboscopic image viewpoint, in which, for a pair of images of the object at different timepoints in which an earlier image of the object has a smaller distance from the stroboscopic image viewpoint than a later image of the object, the earlier image of the object closer to the stroboscopic image viewpoint is displayed nearer the foreground than the later image of the object.

13. Apparatus according to clause 12, comprising a set of devices providing:

two or more image capturing devices, arranged so that the successive images comprise groups of images captured from different respective image capture viewpoints; and one or more distance measuring devices.

14. An image processing method comprising:

receiving successive captured images of an object and depth information indicating a three-dimensional location of the object relative to at least one distance measuring device;

selecting a set of the successive images; and generating a stroboscopic image, with respect to a stroboscopic image viewpoint, by superposing at least parts of the selected set of images, such that amongst the selected set of images of the object, images of the object are arranged in order of distance of the object from the stroboscopic image viewpoint, in which, for a pair of images of the object at different timepoints in which an earlier image of the object has a smaller distance from the stroboscopic image viewpoint than a later image of the object, the earlier image of the object closer to the stroboscopic image viewpoint is displayed nearer the foreground than the later image of the object.

15. Computer software which, when executed by a computer, causes the computer to perform the method of clause 14.

16. A non-transitory machine-readable medium which stores computer software according to clause 15.

17. Image processing apparatus responsive to successive groups of images of an object captured at the same time by two or more spaced apart image capturing devices and to depth information indicating a three-dimensional location of the object relative to at least one distance measuring device, the image processing apparatus comprising:

a frame selecting unit configured to select a set of the successive image groups; and a model generating unit configured to generate a three dimensional model, for each image group in the set of image groups, from images captured at the same time by the two or more spaced apart image capturing devices and from the depth information, and to map a texture to the generated three dimensional model;

a composition unit configured to generate a stroboscopic image, with respect to a stroboscopic image viewpoint, by superposing the three dimensional models generated by the model generating unit on a predetermined background.

18. Apparatus according to clause 17, comprising a set of devices providing:

two or more image capturing devices, arranged so that the successive images comprise groups of images captured from different respective image capture viewpoints; and one or more distance measuring devices.

19. Apparatus according to clause 18, in which the two or more image capturing devices are arranged to capture images in synchronism with one another.

20. Apparatus according to clause 18, comprising a frame synchronising unit to detect a synchronisation shift between the images of a group.

21. Apparatus according to any one of clauses 17 to 20, in which the model generating unit is configured to detect the intersection of visual hulls corresponding to respective images of a group of images.

22. Apparatus according to any one of clauses 17 to 21, in which the model generating unit is configured to generate a mesh representing the object and to perform texture mapping on the generated mesh.

23. An image processing method comprising:
receiving successive groups of images of an object captured at the same time by two or more spaced apart image capturing devices and depth information indicating a three-dimensional location of the object relative to at least one distance measuring device;
   selecting a set of the successive image groups; and
   generating a three dimensional model, for each image group in the set of image groups, from images captured at the same time by the two or more spaced apart image capturing devices and from the depth information;
   mapping a texture to the generated three dimensional model;
   generating a stroboscopic image, with respect to a stroboscopic image viewpoint, by superposing the three dimensional models on a predetermined background.

24. Computer software which, when executed by a computer, causes the computer to perform the method of clause 23.

25. A non-transitory machine-readable medium which stores computer software according to clause 24.

26. Image processing apparatus responsive to successive images providing representations of an object and to depth information indicating a three-dimensional location of the object relative to at least one distance measuring device, the image processing apparatus comprising:
   a frame selecting unit configured to select a set of the successive images; and
   a composition unit configured to generate a stroboscopic image, with respect to a stroboscopic image viewpoint, from the selected set of images;
   in which, when the three-dimensional locations of the object are closer than a threshold separation for at least a pair of the selected images, the composition unit is configured to generate the stroboscopic image using display positions for at least some of the representations of the object for those images different from the display positions of the respective captured images.

27. Apparatus according to clause 26, comprising a set of devices providing:
   two or more image capturing devices, arranged so that the successive images comprise groups of images captured from different respective image capture viewpoints; and
   one or more distance measuring devices.

28. Apparatus according to clause 26 or clause 27, in which the composition unit is configured to generate the stroboscopic image using display positions for the representations of the object for those images along a predetermined display path.

29. An image processing method comprising:
   receiving successive images providing representations of an object and depth information indicating a three-dimensional location of the object relative to at least one distance measuring device;
   selecting a set of the successive images; and
   generating a stroboscopic image, with respect to a stroboscopic image viewpoint, from the selected set of images;
   in which, when the three-dimensional locations of the object are closer than a threshold separation for at least a pair of the selected images, the generating step comprises generating the stroboscopic image using display positions for at least some of the representations of the object for those images different from the display positions of the respective captured images.

30. Computer software which, when executed by a computer, causes the computer to perform the method of clause 29.

31. A non-transitory machine-readable medium which stores computer software according to clause 30.

The present disclosure may employ constituent elements defined by the following further set of numbered clauses:

[Clause 1]
   Image processing apparatus responsive to successive groups of images of an object captured at the same time by two or more spaced apart image capturing devices and to depth information indicating a three-dimensional location of the object relative to at least one distance measuring device, the image processing apparatus comprising:
   a frame selecting unit configured to select a set of the successive image groups;
   a model generating unit configured to generate a three dimensional model, for each image group in the set of image groups, from images captured at the same time by the two or more spaced apart image capturing devices and from the depth information, and to map a texture to the generated three dimensional model; and
   a composition unit configured to generate a stroboscopic image, with respect to a stroboscopic image viewpoint, by superposing the three dimensional models generated by the model generating unit on a predetermined background.

[Clause 2]
   The image processing device according to clause 1, wherein
   the frame selecting unit is configured to select image groups, for use by the model generating unit to generate respective 3D models for inclusion in the stroboscopic image which do not interfere with each other in a 3-dimensional space.

[Clause 3]
   The image processing device according to clause 4, wherein
   the frame selecting unit is configured to detect a degree of interference, being information indicating a degree of overlapping in a 3-dimensional space between a 3D model generated on the basis of a plurality of predetermined viewpoint images and a 3D model generated on the basis of a plurality of other viewpoint images.

[Clause 4]
   The image processing device according to clause 1, further comprising:
   a determining unit that determines presence of movement of the subject according to a change in the position of the subject, wherein
   the composition unit is configured to generate the stroboscopic image in a case where the determining unit determines that movement of the subject is present.

[Clause 5]
   The image processing device according to clause 1, further comprising:
   a display control unit that displays the stroboscopic image on a display device, wherein the display control unit is configured to display the stroboscopic image generated by arranging display positions of the 3D models at different positions from original positions in a case where an amount of change in the position of the subject is equal to or smaller than a predetermined value.

[Clause 6]
   Apparatus according to clause 1, comprising a set of devices providing:
   two or more image capturing devices, arranged so that the successive images comprise groups of images captured from different respective image capture viewpoints; and
   one or more distance measuring devices.

[Clause 7]
Apparatus according to clause 6, in which the two or more image capturing devices are arranged to capture images in synchronism with one another.

[Clause 8]
Apparatus according to clause 6, comprising a frame synchronising unit to detect a synchronisation shift between the images of a group.

[Clause 9]
Apparatus according to any one of clauses 1, 6, 7 and 8, in which the model generating unit is configured to detect the intersection of visual hulls corresponding to respective images of a group of images.

[Clause 10]
Apparatus according to any one of clauses 1, 6, 7, 8 and 9, in which the model generating unit is configured to generate a mesh representing the object and to perform texture mapping on the generated mesh.

[Clause 11]
An image processing method comprising:
receiving successive groups of images of an object captured at the same time by two or more spaced apart image capturing devices and depth information indicating a three-dimensional location of the object relative to at least one distance measuring device;
selecting a set of the successive image groups; and
generating a three dimensional model, for each image group in the set of image groups, from images captured at the same time by the two or more spaced apart image capturing devices and from the depth information;
mapping a texture to the generated three dimensional model;
generating a stroboscopic image, with respect to a stroboscopic image viewpoint, by superposing the three dimensional models on a predetermined background.

[Clause 12]
An image processing device comprising:
an acquisition unit that acquires a plurality of viewpoint images obtained by capturing a subject at a first time point, a plurality of viewpoint images obtained by capturing the subject at a second time point, and a plurality of viewpoint images obtained by capturing the subject at a third time point; and
an image generating unit that generates a composition 3D model including 3D models of the subject at respective time points generated on the basis of the plurality of viewpoint images of the respective time points of at least two time points of the first to third time points on the basis of subject positions of the respective time points.

[Clause 13]
Image processing apparatus responsive to successive captured images of an object and to depth information indicating a three-dimensional location of the object relative to at least one distance measuring device, the image processing apparatus comprising:
a frame selecting unit configured to select a set of the successive images; and
a composition unit configured to generate a stroboscopic image, with respect to a stroboscopic image viewpoint, by superposing at least parts of the selected set of images, such that amongst the selected set of images of the object, images of the object are arranged in order of distance of the object from the stroboscopic image viewpoint, in which, for a pair of images of the object at different timepoints in which an earlier image of the object has a smaller distance from the stroboscopic image viewpoint than a later image of the object, the earlier image of the object closer to the stroboscopic image viewpoint is displayed nearer the foreground than the later image of the object.

[Clause 14]
Apparatus according to clause 13, comprising a set of devices providing:
two or more image capturing devices, arranged so that the successive images comprise groups of images captured from different respective image capture viewpoints; and
one or more distance measuring devices.

[Clause 15]
Image processing apparatus responsive to successive images providing representations of an object and to depth information indicating a three-dimensional location of the object relative to at least one distance measuring device, the image processing apparatus comprising:
a frame selecting unit configured to select a set of the successive images; and
a composition unit configured to generate a stroboscopic image, with respect to a stroboscopic image viewpoint, from the selected set of images;
in which, when the three-dimensional locations of the object are closer than a threshold separation for at least a pair of the selected images, the composition unit is configured to generate the stroboscopic image using display positions for at least some of the representations of the object for those images different from the display positions of the respective captured images.

[Clause 16]
Apparatus according to clause 15 or clause 16, in which the composition unit is configured to generate the stroboscopic image using display positions for the representations of the object for those images along a predetermined display path.

[Clause 17]
Image processing apparatus responsive to successive images containing representations of an object, the image processing apparatus comprising:
an interference detecting unit to detect interference, representing an overlap between the representations of the object in the successive images;
a frame selecting unit configured to select a set of the successive images such that the detected interference between representations of the object in the selected set of images is less than a threshold interference; and
a composition unit configured to generate a stroboscopic image from the selected set of images.

[Clause 18]
Apparatus according to clause 17, comprising a model generator to generate a three-dimensional model of the object from the successive images, and in which the interference detecting unit is configured to detect interference with respect to one or more bounding boxes surrounding the generated three-dimensional model.

[Clause 19]
Apparatus according to clause 17, in which the threshold interference represents an overlap of a predetermined proportion of the image area of the representations of the object.

[Clause 20]
Apparatus according to clause 17, comprising a set of devices providing:
two or more image capturing devices, arranged so that the successive images comprise groups of images captured from different respective image capture viewpoints; and
one or more distance measuring devices.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Image processing device
11 Camera calibration unit
14 3D stroboscopic composition determining unit
15 Interference detecting unit
16 Frame selecting unit
17 3D model generating unit
18 3D stroboscopic composition unit
100 Transmission system
101 Encoding device
201 Decoding device

The invention claimed is:

1. An image processing apparatus responsive to successive groups of images of an object, each image group captured at a respective time by two or more spaced apart image capturing devices, and to depth information measured at each respective time indicating a three-dimensional location of the object relative to at least one distance measuring device, the image processing apparatus comprising:
   a frame selecting unit configured to select a set of the successive image groups;
   a model generating unit configured to
      generate a three dimensional model, for each image group in the selected set of the successive image groups, from images captured at the respective time of the selected image group by the two or more spaced apart image capturing devices and from the depth information, and
      map a texture to the generated three dimensional model; and
   a composition unit configured to generate a stroboscopic image, with respect to a stroboscopic image viewpoint, by superposing the three dimensional models of the selected set of the successive image groups generated by the model generating unit on a predetermined background,
   wherein the frame selecting unit selects the set of the successive image groups used to generate the stroboscopic image according to a moving speed of the object,
   wherein the moving speed of the object is determined using a model of the object that is coarser than the generated three dimensional model, and
   wherein the frame selecting unit, the model generating unit, and the composition unit are each implemented via at least one processor.

2. The image processing apparatus according to claim 1, wherein
   the frame selecting unit is configured to select image groups, for use by the model generating unit to generate respective 3D models for inclusion in the stroboscopic image which do not interfere by any overlapping with each other in a 3-dimensional space.

3. The image processing apparatus according to claim 1, wherein
   the frame selecting unit is configured to detect a degree of interference, being information indicating a degree of overlapping in a 3-dimensional space between a 3D model generated on the basis of a plurality of predetermined viewpoint images and a 3D model generated on the basis of a plurality of other viewpoint images.

4. The image processing apparatus according to claim 1, further comprising:
   a determining unit configured to determine presence of movement of the object according to a change in the position of the object,
   wherein the composition unit is configured to generate the stroboscopic image in a case where the determining unit determines that movement of the object is present, and
   wherein the determining unit is implemented via at least one processor.

5. The image processing apparatus according to claim 1, further comprising:
   a display control unit configured to display the stroboscopic image on a display device,
   wherein the display control unit displays the stroboscopic image generated by arranging display positions of the 3D models at different positions from original positions in a case where an amount of change in the position of the object is equal to or smaller than a predetermined value, and
   wherein the display control unit is implemented via at least one processor.

6. The image processing apparatus according to claim 1, comprising a set of devices providing:
   two or more image capturing devices, arranged so that the successive images comprise groups of images captured from different respective image capture viewpoints; and
   one or more distance measuring devices.

7. The image processing apparatus according to claim 6, in which the two or more image capturing devices are arranged to capture images in synchronism with one another.

8. The image processing apparatus according to claim 6, comprising a frame synchronising unit to detect a synchronisation shift between the images of a group.

9. The image processing apparatus according to claim 1 in which the model generating unit is configured to detect the intersection of visual hulls corresponding to respective images of a group of images.

10. The image processing apparatus according to claim 1 in which the model generating unit is configured to generate a mesh representing the object and to perform texture mapping on the generated mesh.

11. An image processing method comprising:
   receiving successive groups of images of an object, each image group captured at a respective time by two or more spaced apart image capturing devices, and depth information measured at each respective time indicating a three-dimensional location of the object relative to at least one distance measuring device;
   selecting a set of the successive image groups;
   generating a three dimensional model, for each image group in the selected set of the successive image groups, from images captured at the respective time of the selected image group by the two or more spaced apart image capturing devices and from the depth information;
   mapping a texture to the generated three dimensional model; and
   generating a stroboscopic image, with respect to a stroboscopic image viewpoint, by superposing the three dimensional models of the selected set of the successive image groups on a predetermined background,
   wherein the set of the successive image groups used to generate the stroboscopic image is selected according to a moving speed of the object, and wherein the moving speed of the object is determined using a model of the object that is coarser than the generated three dimensional model.

12. An image processing device comprising:
an acquisition unit configured to acquire a plurality of viewpoint images obtained by capturing a subject at a first time point, a plurality of viewpoint images obtained by capturing the subject at a second time point, and a plurality of viewpoint images obtained by capturing the subject at a third time point; and
an image generating unit configured to generate a composition 3D model including 3D models of the subject at respective time points generated on the basis of the plurality of viewpoint images of the respective time points of at least two time points selected from the first to third time points on the basis of subject positions of the respective time points,
wherein the at least two time points used to generate the composition 3D model are selected according to a moving speed of the subject,
wherein the moving speed of the object is determined using a model of the object that is coarser than the generated three dimensional model, and
wherein the acquisition unit and the image generating unit are each implemented via at least one processor.

13. An image processing apparatus responsive to successive captured images of an object and to depth information indicating a three-dimensional location of the object relative to at least one distance measuring device, the image processing apparatus comprising:
a frame selecting unit configured to select a set of the successive captured images; and
a composition unit configured to generate a stroboscopic image, with respect to a stroboscopic image viewpoint, by superposing at least parts of the selected set of the successive captured images, such that amongst the selected set of the successive images of the object, images of the object are arranged in order of distance of the object from the stroboscopic image viewpoint, in which, for a pair of images of the object at different timepoints in which an earlier image of the object has a smaller distance from the stroboscopic image viewpoint than a later image of the object, the earlier image of the object closer to the stroboscopic image viewpoint is displayed nearer the foreground than the later image of the object,
wherein the frame selecting unit selects the set of the successive captured images used to generate the stroboscopic image according to a moving speed of the object,
wherein the moving speed of the object is determined using a model of the object that is coarser than the generated three dimensional model, and
wherein the frame selecting unit and the composition unit are each implemented via at least one processor.

14. The image processing apparatus according to claim 13, comprising a set of devices providing:
two or more image capturing devices, arranged so that the successive images comprise groups of images captured from different respective image capture viewpoints; and
one or more distance measuring devices.

15. An image processing apparatus responsive to successive images providing representations of an object and to depth information indicating a three-dimensional location of the object relative to at least one distance measuring device, the image processing apparatus comprising:
a frame selecting unit configured to select a set of the successive images; and
a composition unit configured to generate a stroboscopic image, with respect to a stroboscopic image viewpoint, from the selected set of the successive images,
wherein, when the three-dimensional locations of the object are closer than a threshold separation for at least a pair of images within the selected set of the successive images, the composition unit is configured to generate the stroboscopic image using display positions for at least some of the representations of the object for those images different from the display positions of the respective captured images,
wherein the frame selecting unit selects the set of the successive captured images used to generate the stroboscopic image according to a moving speed of the object,
wherein the moving speed of the object is determined using a model of the object that is coarser than the generated three dimensional model, and
wherein the frame selecting unit and the composition unit are each implemented via at least one processor.

16. The image processing apparatus according to claim 15, in which the composition unit is configured to generate the stroboscopic image using display positions for the representations of the object for those images along a predetermined display path.

17. An image processing apparatus responsive to successive images containing representations of an object, the image processing apparatus comprising:
an interference detecting unit configured to detect interference, representing an overlap between the representations of the object in the successive images;
a frame selecting unit configured to select a set of the successive images such that the detected interference between representations of the object in the selected set of images is less than a threshold interference; and
a composition unit configured to generate a stroboscopic image from the selected set of the successive images,
wherein the frame selecting unit selects the set of the successive captured images used to generate the stroboscopic image according to a moving speed of the object,
wherein the moving speed of the object is determined using a model of the object that is coarser than the generated three dimensional model, and
wherein the interference detecting unit, the frame selecting unit, and the composition unit are each implemented via at least one processor.

18. The image processing apparatus according to claim 17, comprising a model generator to generate a three-dimensional model of the object from the successive images, and in which the interference detecting unit is configured to detect interference with respect to one or more bounding boxes surrounding the generated three-dimensional model.

19. The image processing apparatus according to claim 17, in which the threshold interference represents an overlap of a predetermined proportion of the image area of the representations of the object.

20. The image processing apparatus according to claim 17, comprising a set of devices providing:
two or more image capturing devices, arranged so that the successive images comprise groups of images captured from different respective image capture viewpoints; and
one or more distance measuring devices.

21. The image processing apparatus according to claim 17,
wherein the frame selecting unit selects the set of the successive image groups further according to a detected degree of interference indicating overlap of the object between composition silhouette images that are obtained before the model generating unit generates the three dimensional model.

* * * * *